United States Patent
Oba et al.

(10) Patent No.: US 7,806,795 B2
(45) Date of Patent: Oct. 5, 2010

(54) POWER OUTPUT APPARATUS AND HYBRID VEHICLE WITH POWER OUTPUT APPARATUS

(75) Inventors: Hidehiro Oba, Aichi-ken (JP); Yukihiko Ideshio, Susono (JP); Takashi Kawai, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 336 days.

(21) Appl. No.: 12/213,530

(22) Filed: Jun. 20, 2008

(65) Prior Publication Data

US 2008/0318721 A1 Dec. 25, 2008

(30) Foreign Application Priority Data

Jun. 22, 2007 (JP) ............................. 2007-164743

(51) Int. Cl.
*F16H 3/72* (2006.01)
(52) U.S. Cl. ........................................ 475/5; 180/65.21
(58) Field of Classification Search ...................... 475/5; 180/65.21, 65.225, 65.235, 65.24, 65.245, 180/65.25, 65.31, 65.6, 65.7
See application file for complete search history.

(56) References Cited

U.S. PATENT DOCUMENTS 7,282,004 B2 * 10/2007 Raghavan et al. .............. 475/5
7,338,401 B2 * 3/2008 Klemen et al. ................. 475/5
2008/0300744 A1 * 12/2008 Katsuta et al. ................. 701/22

FOREIGN PATENT DOCUMENTS

| JP | 2000-069611 A | 3/2000 |
| JP | 2003-106389 A | 4/2003 |
| JP | 3640954 | 1/2005 |
| JP | 2005-155891 A | 6/2005 |
| JP | 2006-282069 A | 10/2006 |

* cited by examiner

*Primary Examiner*—David D Le
(74) *Attorney, Agent, or Firm*—Kenyon & Kenyon LLP

(57) ABSTRACT

A hybrid vehicle 20 of the invention is equipped with a power distribution integration mechanism 40 and a transmission 60. The power distribution integration mechanism 40 is a double pinion planetary gear mechanism constructed to include a carrier 45 connecting with a motor MG2, a sun gear 41 connecting with a motor MG1, and a ring gear 42 connecting with an engine 22 and to have a gear ratio of approximately 0.5. The transmission 60 includes a three element-type first change speed planetary gear mechanism PG1, a three element-type second change speed planetary gear mechanism PG2, a brake clutch BC1 configured to fix a ring gear 62 of the first change speed planetary gear mechanism PG1 in a non-rotatable manner and release the ring gear 62 in a rotatable manner, and a brake clutch BC2 configured to enable and disable power transmission via the second change speed planetary gear mechanism PG2.

19 Claims, 12 Drawing Sheets

FIG.12

| | Change Speed State | BC1 | BC2 | C0 |
|---|---|---|---|---|
| In Engine Operation Mode | 1st Speed | R | M | ON |
| | 1st Speed-2nd Speed Simultaneous Engagement | R | R | ON |
| | 2nd Speed | M | R | ON |
| | 2nd Speed-3rd Speed Simultaneous Engagement | L | R | ON |
| | 3rd Speed | L | M | ON |
| | 3rd Speed OD | L | L | ON |
| In Motor Drive Mode | 1st Speed | R | M | ON/OFF |
| | 1st Speed-2nd Speed Simultaneous Engagement | R | R | OFF |
| | 2nd Speed | M | R | ON/OFF |
| | 2nd Speed-3rd Speed Simultaneous Engagement | L | R | OFF |
| | 3rd Speed | L | M | ON/OFF |
| | 3rd Speed OD | L | L | OFF |

FIG.15

| | Change Speed State | BC1 | BC2' | B3 | C0 |
|---|---|---|---|---|---|
| In Engine Operation Mode | 1st Speed | R | M | OFF | ON |
| | 1st Speed-2nd Speed Simultaneous Engagement | R | L | OFF | ON |
| | 2nd Speed | M | L | OFF | ON |
| | 2nd Speed-3rd Speed Simultaneous Engagement | L | L | OFF | ON |
| | 3rd Speed | L | M | OFF | ON |
| | Equal Rotation Transmission | L | R | OFF | ON |
| | 3rd Speed OD | L | M | ON | ON |
| In Motor Drive Mode | 1st Speed | R | M | OFF | ON/OFF |
| | 1st Speed-2nd Speed Simultaneous Engagement | R | L | OFF | OFF |
| | 2nd Speed | M | L | OFF | ON/OFF |
| | 2nd Speed-3rd Speed Simultaneous Engagement | L | L | OFF | OFF |
| | 3rd Speed | L | M | OFF | ON/OFF |
| | Equal Rotation Transmission | L | R | OFF | OFF |
| | 3rd Speed OD | L | M | ON | OFF |

FIG.16

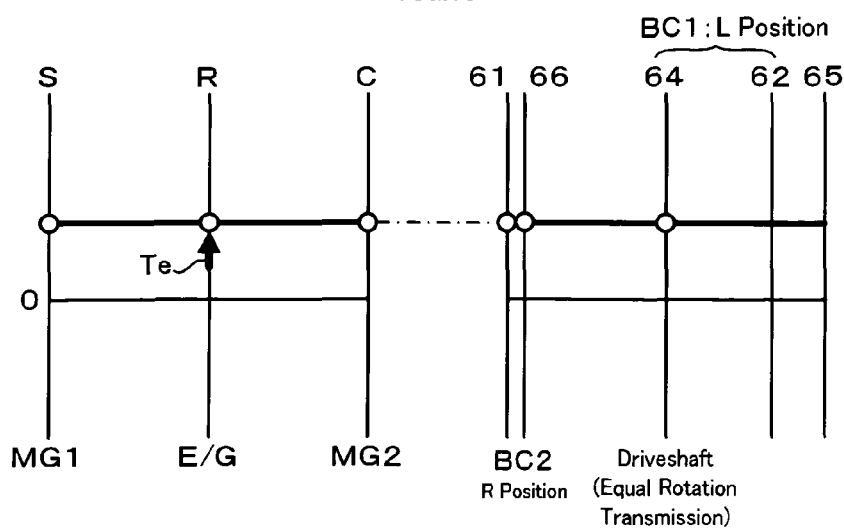

POWER OUTPUT APPARATUS AND HYBRID VEHICLE WITH POWER OUTPUT APPARATUS

BACKGROUND OF THE INVENTION

1. Field of the Invention

The present invention relates to a power output apparatus configured to output power to a driveshaft and to a hybrid vehicle equipped with such a power output apparatus.

2. Description of the Prior Art

One proposed structure of the power output apparatus includes an internal combustion engine, two motors, a Ravigneaux planetary gear mechanism, and a parallel shaft-type transmission arranged to selectively link an output member with one of two output elements of the planetary gear mechanism respectively connected to the motors (see, for example, Japanese Patent Laid-Open No. 2005-155891). Another proposed structure of the power output apparatus includes a planetary gear mechanism having an input element connected to an internal combustion engine and two output elements respectively connected to motors, and a parallel shaft-type transmission including two countershafts respectively connected to the corresponding output elements of the planetary gear mechanism and linked with an output shaft (see, for example, Japanese Patent Laid-Open No. 2003-106389). In these prior art power output apparatuses, the parallel shaft-type transmission switches over the output element of the planetary gear mechanism to be linked with the output member or with the output shaft.

Because of the limited space for mounting the power output apparatus, there is a difficulty in application of the power output apparatus in the former cited reference to a vehicle having a rear wheel-drive system as a main drive system, that is, a rear wheel-drive vehicle or a rear wheel drive-based four wheel drive vehicle. The power output apparatus in the latter cited reference is applicable to the rear wheel-drive vehicle. The parallel shaft-type transmission, however, has rather large dimensions both in an axial direction and in a radial direction and is thus not suitable for mounting on the vehicle. The power output apparatus in the latter cited reference also requires a rotor of a large diameter and thereby causes its electrical drive system to be rather bulky and unsuitable for mounting on the vehicle. Moreover the power output apparatus in the latter cited reference has the low possibility for the practical application. In application of the power output apparatus in the latter cited reference to the vehicle having the rear wheel-drive system as the main drive system, a further improvement of the power transmission efficiency is required in a wider drive range. There is thus still room for improvement in the power output apparatuses of these prior art structures.

SUMMARY OF THE INVENTION

There would thus be a demand for size reduction of the power output apparatus to be favorably mounted on a vehicle and especially suitable for a vehicle having a rear wheel drive system as a main drive system. In the power output apparatus and the hybrid vehicle equipped with the power output apparatus, there would also be a demand for improvement of power transmission efficiency in a wide drive range.

The present invention accomplishes at least part of the demands mentioned above by the following configurations applied to the power output apparatus and to the hybrid vehicle with the power output apparatus.

According to one aspect, the invention is directed to a power output apparatus configured to output power to a driveshaft. The power output apparatus includes: an internal combustion engine; a first motor capable power input and power output; a second motor capable power input and power output; an accumulator configured to transmit electric power to and from the first motor and the second motor; a power distribution integration mechanism being a planetary gear mechanism including a first element connecting with a rotating shaft of the first motor, a second element connecting with a rotating shaft of the second motor, and a third element connecting with an engine shaft of the internal combustion engine, and configured to allow mutually differential rotations of the three elements and to have a gear ratio of approximately 0.5; and a change speed transmission assembly. The change speed transmission assembly includes: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism.

The power output apparatus according to one aspect of the invention is equipped with the power distribution integration mechanism constructed as the three element-type planetary gear mechanism having a gear ratio of approximately 0.5. The power distribution integration mechanism of this structure is small-sized and enables the first motor and the second motor to have identical specifications without requiring a reduction gear mechanism or any equivalent mechanism. This arrangement thus contributes to size reduction of the power output apparatus. The power output apparatus is also equipped with the change speed transmission assembly including the three-element-type first change speed planetary gear mechanism and the three-element-type second change speed planetary gear mechanism. The change speed transmission assembly is arranged coaxially with and in the downstream of the internal combustion engine, the first motor, the second motor, and the power distribution integration mechanism. The change speed transmission assembly of this arrangement enables size reduction both in its axial direction and in its radial direction, compared with the parallel shaft-type change speed transmission assembly. The combination of the power distribution integration mechanism constructed as the three element-type planetary gear mechanism having the gear ratio of approximately 0.5 with the change speed transmission assembly including the three element-type first change speed planetary gear mechanism and the three element-type second change speed planetary gear mechanism desirably downsizes the power output apparatus to be extremely favorable for mounting on the vehicle having a rear wheel drive system as a main drive system. In one state of the change speed transmission assembly, the first fixation structure is set to fix the fixable element of the first change speed planetary gear mechanism in the non-rotatable manner, while the transmission state changeover structure is set to disable the power transmission via the second change speed planetary gear mechanism. Such setting causes the first element of the power distribution integration mechanism to work as the output element and enables the first motor connecting with the first element to function as the motor, while enabling the second motor connecting with the second element working as the reactive element to function as the generator. In another state of the change speed transmission assembly, the first fixation structure is set to release the fixable element of the first change speed planetary gear mechanism in the rotatable manner and thereby disable the power transmission via the first change speed planetary gear mechanism, while the transmission state changeover structure is set to enable the power transmission via the second change speed planetary gear mechanism. Such setting causes the second element of the power distribution integration mechanism to work as the output element and enables the second motor connecting with the second element to function as the motor, while enabling the first motor connecting with the first element working as the reactive element to function as the generator. In the power output apparatus according to this aspect of the invention, the first fixation structure and the transmission state changeover structure are adequately controlled to prevent the occurrence of power circulation that is triggered by a negative rotation speed of the second motor or the first motor functioning as the generator in response to an increase in rotation speed of the first motor or the second motor functioning as the motor. In another state of the change speed transmission assembly, the first fixation structure is set to fix the fixable element of the first change speed planetary gear mechanism in the non-rotatable manner, while the transmission state changeover structure is set to enable the power transmission via the second change speed planetary gear mechanism. Such setting enables the power of the internal combustion engine to be mechanically (directly) transmitted to the driveshaft at a fixed change gear ratio. The power output apparatus of this arrangement effectively improves the power transmission efficiency in a wide drive range. The gear ratio of approximately 0.5 may be selected in a range of 0.4 to 0.6.

In one preferable embodiment according to one aspect of the invention, the power distribution integration mechanism may be a double pinion planetary gear mechanism including a ring gear as the third element, a sun gear as the second element, and a carrier as the first element arranged to hold sets of two pinion gears engaging with each other, one of the two pinion gears engaging with the ring gear and the other of the two pinion gears engaging with the sun gear. The power distribution integration mechanism constructed as the double pinion planetary gear mechanism having the gear ratio of approximately 0.5 has a smaller outer diameter and accordingly enables further size reduction of the power output apparatus.

In one preferable application of the power output apparatus, the fixable element of the second change speed planetary gear mechanism may be fixed in the non-rotatable manner, and the transmission state changeover device may be a coupling-decoupling device configured to couple and decouple the second element of the power distribution integration mechanism with and from the input element of the second change speed planetary gear mechanism. The transmission state changeover structure may be configured to enable and disable the power input into the second change speed planetary gear mechanism.

In one preferable embodiment of the power output apparatus of the above application, the change speed transmission assembly may further include a coupling device configured to couple and decouple the output element with and from the fixable element of the first change speed planetary gear mechanism. In one state of the change speed transmission assembly of this structure, while the transmission state changeover structure is set to enable the power transmission via the second change speed planetary gear mechanism, the coupling structure is set to couple the output element with the fixable element of the first change speed planetary gear mechanism. Such setting enables the power of the internal combustion engine to be mechanically (directly) transmitted to the driveshaft at a fixed change gear ratio, which is different from the fixed change gear ratio in the state of fixing the fixable element of the first change speed planetary gear mechanism in the non-rotatable manner by means of the first fixation structure and enabling the power transmission via the second change speed planetary gear mechanism by means of the transmission state changeover structure. In this state, setting the transmission state changeover structure to disable the power transmission via the second change speed planetary gear mechanism causes the coupling structure to substantially lock and integrally rotate the respective elements of the first change speed planetary gear mechanism. Such setting enables direct transmission of the power from the first element of the power distribution integration mechanism to the driveshaft. This arrangement ensures the enhanced power transmission efficiency in a wider drive range.

In the power output apparatus of the above embodiment, the change speed transmission assembly may include one single clutch functioning both as the first fixation device and as the coupling device. This arrangement effectively downsizes the change speed transmission assembly and the whole power output apparatus, while simplifying their configurations.

In another preferable application of the power output apparatus, the transmission state changeover device may be a second fixation device configured to fix the fixable element of the second change speed planetary gear mechanism in a non-rotatable manner and to release the fixable element in a rotatable manner. The transmission state changeover structure may be configured to fix the fixable element in the non-rotatable manner and thereby enable the power transmission via the second change speed planetary gear mechanism and to release the fixable element in the rotatable manner and thereby disable the power transmission via the second change speed planetary gear mechanism.

In one preferable embodiment of the power output apparatus of the above application, the change speed transmission assembly may further include a first coupling device configured to couple and decouple the output element with and from the fixable element of the first change speed planetary gear mechanism, and a second coupling device configured to couple and decouple the output element with and from the fixable element of the second change speed planetary gear mechanism. In one state of the change speed transmission assembly of this structure, the transmission state changeover structure is set to enable the power transmission via the second change speed planetary gear mechanism, while the first coupling structure is set to couple the output element with the fixable element of the first change speed planetary gear mechanism. Such setting enables the power of the internal combustion engine to be mechanically (directly) transmitted to the driveshaft at a fixed change gear ratio, which is different from the fixed change gear ratio in the state of fixing the fixable element of the first change speed planetary gear mechanism in the non-rotatable manner by means of the first fixation structure and enabling the power transmission via the second change speed planetary gear mechanism by means of the transmission state changeover structure. In this state, setting the transmission state changeover structure to disable the power transmission via the second change speed planetary gear mechanism causes the first coupling structure to substantially lock and integrally rotate the respective elements of the first change speed planetary gear mechanism. Such setting enables direct transmission of the power from the first element of the power distribution integration mechanism to the driveshaft. In another state of the change speed transmission assembly, the first coupling structure is set to couple the output element with the fixable element of the first change speed planetary gear mechanism, while the second coupling structure is set to couple the output element with the fixable element of the second change speed planetary gear mechanism. Such setting causes the respective elements of the power distribution integration mechanism and the respective elements of the first and the second change speed planetary gear mechanisms to be integrally rotated. Such setting enables the power of the internal combustion engine to be mechanically (directly) transmitted to the driveshaft at a fixed change gear ratio of 1, which is different from the fixed change gear ratio in the state of fixing the fixable element of the first change speed planetary gear mechanism in the non-rotatable manner and enabling the power transmission via the second change speed planetary gear mechanism by means of the transmission state changeover structure and from the fixed change gear ratio in the state of enabling the power transmission via the second change speed planetary gear mechanism and coupling the output element with the fixable element of the first change speed planetary gear mechanism by means of the first coupling structure. This arrangement ensures the enhanced power transmission efficiency in a wider drive range.

In the power output apparatus of the above embodiment, the change speed transmission assembly may include one single first clutch functioning both as the first fixation device and as the first coupling device and one single second clutch functioning both as the second fixation device and as the second coupling device. This arrangement effectively downsizes the change speed transmission assembly and the whole power output apparatus, while simplifying their configurations.

The power output apparatus may further include: a third fixation device configured to fix either one of the first element and the second element of the power distribution integration mechanism in a non-rotatable manner. The non-rotatable fixation of either the first element or the second element (reactive element) of the power distribution integration mechanism connecting with the first motor or with the second motor functioning as the generator in the state of coupling the output element with the fixable element in either of the first change speed planetary gear mechanism and the second change speed planetary gear mechanism enables the power of the internal combustion engine to be mechanically (directly) transmitted to the driveshaft at a fixed change gear ratio of less than 1 intrinsic to this state. This arrangement desirably improves the power transmission efficiency in a wider drive range.

In one preferable embodiment of the power output apparatus according to the above aspect of the invention, the first change speed planetary gear mechanism may be a single pinion planetary gear mechanism including a sun gear as the input element, a ring gear as the fixable element, and a carrier as the output element arranged to hold pinion gears respectively engaging with both the sun gear and the ring gear, and the second change speed planetary gear mechanism may be a single pinion planetary gear mechanism including a ring gear as the input element, a sun gear as the fixable element, and a carrier as the output element arranged to hold pinion gears respectively engaging with both the ring gear and the sun gear. The first and the second change speed planetary gear mechanisms constructed as the single pinion planetary gear mechanisms effectively downsizes the change speed transmission assembly and the whole power output apparatus.

In one preferable application of the power output apparatus of this embodiment, the sun gear of the second change speed planetary gear mechanism may be attached to a hollow sun gear shaft, and the ring gear of the second change speed planetary gear mechanism may be connected with the second element of the power distribution integration mechanism via a shaft located in and passed through the hollow sun gear shaft. The ring gear as the input element of the second change speed planetary gear mechanism is connectable with the second element of the power distribution integration mechanism, while the sun gear as the fixable element of the second change speed planetary gear mechanism is fixable in the non-rotatable manner.

In another preferable application of the power output apparatus of this embodiment, the sun gear of the second change speed planetary gear mechanism may be attached to a hollow sun gear shaft, and the carrier of the second change speed planetary gear mechanism may be connected with driveshaft via a shaft located in and passed through the hollow sun gear shaft. The ring gear as the input element is connectable with the second element of the power distribution integration mechanism, while the sun gear as the fixable element of the second change speed planetary gear mechanism is fixable in the non-rotatable manner.

In another preferable embodiment of the power output apparatus according to the above aspect of the invention, the first change speed planetary gear mechanism may be a single pinion planetary gear mechanism including a sun gear as the input element, a ring gear as the fixable element, and a carrier as the output element arranged to hold pinion gears respectively engaging with both the sun gear and the ring gear, and the second change speed planetary gear mechanism may be a planetary gear mechanism including a first sun gear as the input element, a second sun gear as the output element having a different number of teeth from that of the first sun gear and connected with the carrier of the first change speed planetary gear mechanism and with the driveshaft, and a carrier as the fixable element arranged to hold a stepped gear of linking a first pinion gear engaging with the first sun gear to a second pinion gear engaging with the second sun gear. The second change speed planetary gear mechanism constructed as the planetary gear mechanism including the stepped gear has a smaller dimension in its radial direction, thus enabling size reduction of the change speed transmission assembly especially in the radial direction.

In still another preferable embodiment of the power output apparatus according to the above aspect of the invention, the first change speed planetary gear mechanism may be a single pinion planetary gear mechanism including a sun gear as the input element, a ring gear as the fixable element, and a carrier as the output element arranged to hold pinion gears respectively engaging with both the sun gear and the ring gear, and the second change speed planetary gear mechanism may be a double pinion planetary gear mechanism including a sun gear as the input element, a ring gear as the output element, and a carrier as the fixable element arranged to hold sets of two pinion gears engaging with each other, one of the two pinion gears engaging with the sun gear and the other of the two pinion gears engaging with the ring gear.

According to another aspect, the invention is directed to a hybrid vehicle with drive wheels driven by means of power from a driveshaft. The hybrid vehicle includes: an internal combustion engine; a first motor capable power input and power output; a second motor capable power input and power output; an accumulator configured to transmit electric power to and from the first motor and the second motor; a power distribution integration mechanism being a planetary gear mechanism including a first element connecting with a rotating shaft of the first motor, a second element connecting with a rotating shaft of the second motor, and a third element connecting with an engine shaft of the internal combustion engine, and configured to allow mutually differential rotations of the three elements and to have a gear ratio of approximately 0.5; and a change speed transmission assembly. The change speed transmission assembly includes: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism.

The power output apparatus mounted on the hybrid vehicle is downsized to be especially suitable for the vehicle having a rear wheel drive system as a main drive system and is arranged to improve the power transmission efficiency in a wide drive range. The hybrid vehicle according to the above aspect of the invention accordingly has the enhanced fuel efficiency and the improved driving performance.

BRIEF DESCRIPTION OF THE DRAWINGS

FIG. 12 shows settings of clutch positions of brake clutches BC1 and BC2 and the clutch C0 during a drive of the hybrid vehicle 20.

FIG. 15 shows settings of clutch positions of brake clutches BC1 and BC2', a brake B3, and the clutch C0 during a drive of the hybrid vehicle 20 equipped with the transmission 60B including the brake clutch BC2';

FIG. 16 shows torque-rotation speed dynamics of primary elements included in the power distribution integration mechanism 40 and the transmission 60B in an equal rotation transmission state;

DESCRIPTION OF THE PREFERRED EMBODIMENTS

Some modes of carrying out the invention are described below with reference to the accompanied drawings.

Figure 1:
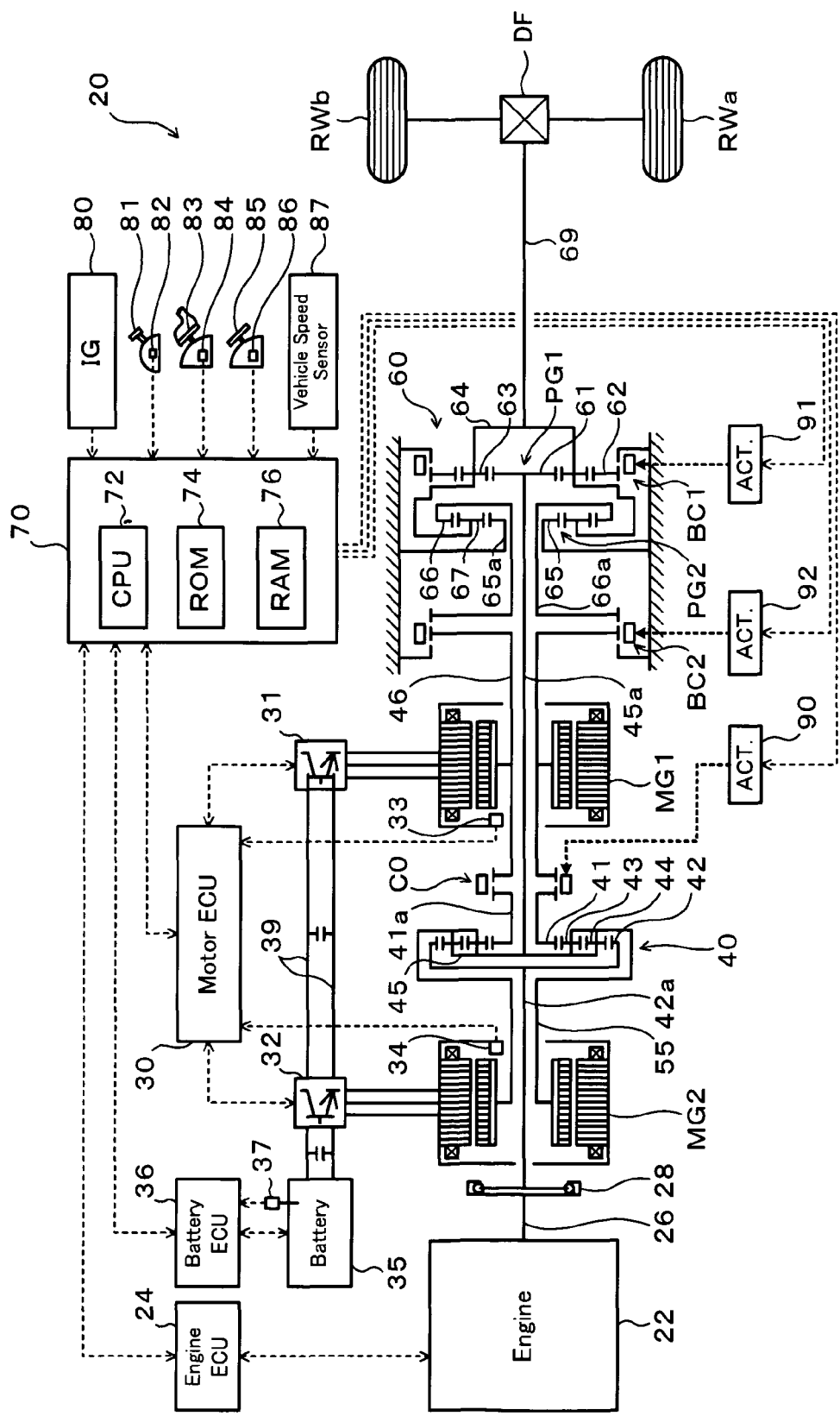
FIG. 1 schematically illustrates the configuration of a hybrid vehicle 20 in one embodiment of the invention.

FIG. 1 schematically illustrates the configuration of a hybrid vehicle 20 in one embodiment of the invention. The hybrid vehicle 20 shown in FIG. 1 is constructed as a rear-wheel drive vehicle and includes an engine 22 located in a front portion of the vehicle body, a power distribution integration mechanism 40 connected to a crankshaft 26 of the engine 22, a motor MG1 linked with the power distribution integration mechanism 40 and arranged to have power generation capability, a motor MG2 linked with the power distribution integration mechanism 40 and arranged to be coaxial with the motor MG1 and have power generation capability, a transmission 60 arranged to convert the output power of the power distribution integration mechanism 40 and transmit the converted power to a driveshaft 69, and a hybrid electronic control unit (hereafter referred to as 'hybrid ECU') 70 configured to control the operations of the whole hybrid vehicle 20.

The engine 22 is an internal combustion engine that receives a supply of a hydrocarbon fuel, such as gasoline or light oil, and outputs power. The engine 22 is under control of an engine electronic control unit (hereafter referred to as 'engine ECU') 24 and is subjected to, for example, fuel injection control, ignition control, and intake air control. The engine ECU 24 inputs diverse signals from various sensors that are provided for the engine 22 to measure and detect the operating conditions of the engine 22, for example, a crank position sensor (not shown) attached to the crankshaft 26. The engine ECU 24 establishes communication with the hybrid ECU 70 to drive and control the engine 22 in response to control signals from the hybrid ECU 70 and with reference to the diverse signals from the various sensors and to output data regarding the operating conditions of the engine 22 to the hybrid ECU 70 according to the requirements.

The motors MG1 and MG2 are constructed as synchronous motor generators of an identical specification that may be actuated both as a generator and as a motor. The motors MG1 and MG2 transmit electric power to and from a battery 35 as a secondary cell via inverters 31 and 32. Power lines 39 connecting the battery 35 with the inverters 31 and 32 are structured as common positive bus and negative bus shared by the inverters 31 and 32. Such connection enables electric power generated by one of the motors MG1 and MG2 to be consumed by the other motor MG2 or MG1. The battery 35 may thus be charged with surplus electric power generated by either of the motors MG1 and MG2, while being discharged to supplement insufficient electric power. The battery 35 is neither charged nor discharged upon the balance of the input and output of electric powers between the motors MG1 and MG2. Both the motors MG1 and MG2 are driven and controlled by a motor electronic control unit (hereafter referred to as 'motor ECU') 30. The motor ECU 30 inputs various signals required for driving and controlling the motors MG1 and MG2, for example, signals representing rotational positions of rotors in the motors MG1 and MG2 from rotational position detection sensors 33 and 34 and signals representing phase currents to be applied to the motors MG1 and MG2 from current sensors (not shown). The motor ECU 30 outputs switching control signals to the inverters 31 and 32. The motor ECU 30 executes a rotation speed computation routine (not shown) to compute rotation speeds Nm1 and Nm2 of the rotors in the motors MG1 and MG2 from the signals output from the rotational position detection sensors 33 and 34. The motor ECU 30 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 35 is under control and management of a battery electronic control unit (hereafter referred to as 'battery ECU') 36. The battery ECU 36 inputs various signals required for management and control of the battery 35, for example, an inter-terminal voltage from a voltage sensor (not shown) located between terminals of the battery 35, a charge-discharge current from a current sensor (not shown) located in the power line 39 connecting with an output terminal of the battery 35, and a battery temperature Tb from a temperature sensor 37 attached to the battery 35. The battery ECU 36 outputs data regarding the operating conditions of the battery 35 by communication to the hybrid ECU 70 and to the engine ECU 24 according to the requirements. In the structure of this embodiment, the battery ECU 36 computes a remaining charge level or current state of charge SOC of the battery 35 from integration of the charge-discharge current measured by the current sensor and calculates a charge-discharge power demand Pb* of the battery 35 from the computed state of charge SOC. The battery ECU 36 also sets an input limit Win as an allowable charging power to be charged into the battery 35 and an output limit Wout as an allowable discharging power to be discharged from the battery 35, based on the computed state of charge SOC and the measured battery temperature Tb. A concrete procedure of setting the input limit Win and the output limit Wout of the battery 35 sets base values of the input limit Win and the output limit Wout corresponding to the battery temperature Tb, specifies an input limit correction factor and an output limit correction factor corresponding to the state of charge SOC of the battery 35, and multiplies the base values of the input limit Win and the output limit Wout by the specified input limit correction factor and output limit correction factor to determine the input limit Win and the output limit Wout of the battery 35.

The power distribution integration mechanism 40 is provided with the motors MG1 and MG2 and the transmission 60 in a non-illustrated transmission case (casing) and is arranged apart from the engine 22 by a predetermined distance to be coaxial with the crankshaft 26. The power distribution integration mechanism 40 of the embodiment is constructed as a double pinion planetary gear mechanism and includes a sun gear 41 as an external gear, a ring gear 42 as an internal gear arranged concentrically with the sun gear 41, and a carrier 45 arranged to support at least one set of two intermeshing pinion gears 43 and 44 such as to allow both their revolutions and their rotations on their axes, where one of the two intermeshing pinion gears 43 and 44 engages with the sun gear 41 and the other engages with the ring gear 42. In this power distribution integration mechanism 40, the sun gear 41 (second element), the ring gear 42 (third element), and the carrier 45 (first element) are designed as elements of differential rotations. The sun gear 41 as the second element of the power distribution integration mechanism 40 is connected with the motor MG1 (more specifically with its hollow rotor) as a second motor via a hollow sun gear shaft 41a extended from the sun gear 41 in a direction opposite to the engine 22 (that is, in a rearward direction of the vehicle body) and a hollow first motor shaft 46. The carrier 45 as the first element is connected with the motor MG2 (more specifically with its hollow rotor) as a first motor via a hollow second motor shaft 55 extended toward the engine 22. The ring gear 42 as the third element is connected with the crankshaft 26 of the engine 22 via a ring gear shaft 42a extended to pass through the second motor shaft 55 and the motor MG2, as well as a damper 28. In the structure of this embodiment, the power distribution integration mechanism 40 is constructed to have a gear ratio ρ (division of the number of teeth of the sun gear 41 by the number of teeth of the ring gear 42) satisfying an equation of ρ=0.5. Since the sun gear 41 and the carrier 45 have equal torque distribution fractions from the engine 22, the motors MG1 and MG2 are enabled to have identical specifications without using a reduction gear mechanism or any equivalent mechanism. This arrangement desirably downsizes the power output apparatus, improves the productivity of the power output apparatus, and reduces the manufacturing cost of the power output apparatus. The gear ratio ρ of the power distribution integration mechanism 40 may otherwise be selected in a preset range of, for example, 0.4 to 0.6.

As shown in FIG. 1, a clutch C0 (coupling-decoupling structure) is provided between the sun gear shaft 41a and the first motor shaft 46 to allow and release coupling (coupling of driving source elements) between the sun gear shaft 41a and the first motor shaft 46. In this embodiment, the clutch C0 may be constructed, for example, as a dog clutch including a movable engaging member, which is moved back and forth in an axial direction of the sun gear shaft 41a and the first motor shaft 46 by means of an electromagnetic, electric, or hydraulic actuator 90 to be engageable both with a mating engagement element fastened to the sun gear shaft 41a and with a mating engagement element fastened to the first motor shaft 46. In response to release of the coupling between the sun gear shaft 41a and the first motor shaft 46 by the clutch C0, the motor MG1 as the second motor is disconnected from the sun gear 41 as the second element of the power distribution integration mechanism 40. The function of the power distribution integration mechanism 40 thus substantially separates the engine 22 from the motors MG1 and MG2 and the transmission 60. The first motor shaft 46 linkable with the sun gear 41 of the power distribution integration mechanism 40 via the clutch C0 is further extended from the motor MG1 in the direction opposite to the engine 22 (toward the rear portion of the vehicle body) and is connected with the transmission 60. A carrier shaft (coupling shaft) 45a is extended from the carrier 45 of the power distribution integration mechanism 40 in the direction opposite to the engine 22 (toward the rear portion of the vehicle body) to pass through the hollow sun gear shaft 41a and the hollow first motor shaft 46. The carrier shaft 45a is accordingly connected with the transmission 60. In the structure of the embodiment, the power distribution integration mechanism 40 is arranged coaxially with the motors MG1 and MG2 and is located between the motors MG1 and MG2 of a mutually coaxial arrangement. The engine 22 is arranged coaxially with the motor MG2 and is located to face the transmission 60 across the power distribution integration mechanism 40. The engine 22, the motor MG2, the power distribution integration mechanism 40, the motor MG1, and the transmission 60 as the constituents of the power output apparatus are thus arranged in this sequence from the forward to the rearward of the vehicle body. This arrangement reduces the size of the power output apparatus to be suitable for mounting on the hybrid vehicle 20 having a rear wheel drive system as a main drive system.

The transmission 60 is a planetary gear-type automatic transmission constructed to change the speed (gear ratio) at multiple different stages. The transmission 60 includes a first change speed planetary gear mechanism PG1 (first change speed differential rotation mechanism) connected via the carrier shaft 45a with the carrier 45 as the first element of the power distribution integration mechanism 40, a second change speed planetary gear mechanism PG2 (second change speed differential rotation mechanism) connected with the first motor shaft 46, which is connectable via the clutch C0 with the sun gear 41 as the second element of the power distribution integration mechanism 40, a brake clutch BC1 (first fixation structure and first coupling structure) provided corresponding to the first change speed planetary gear mechanism PG1, a brake clutch BC2 (transmission state changeover device and third fixation structure). The respective constituent elements of the first change speed planetary gear mechanism PG1, the second change speed planetary gear mechanism PG2, the brake clutches BC1 and BC2 are all located inside the transmission case of the transmission 60.

Figure 2:
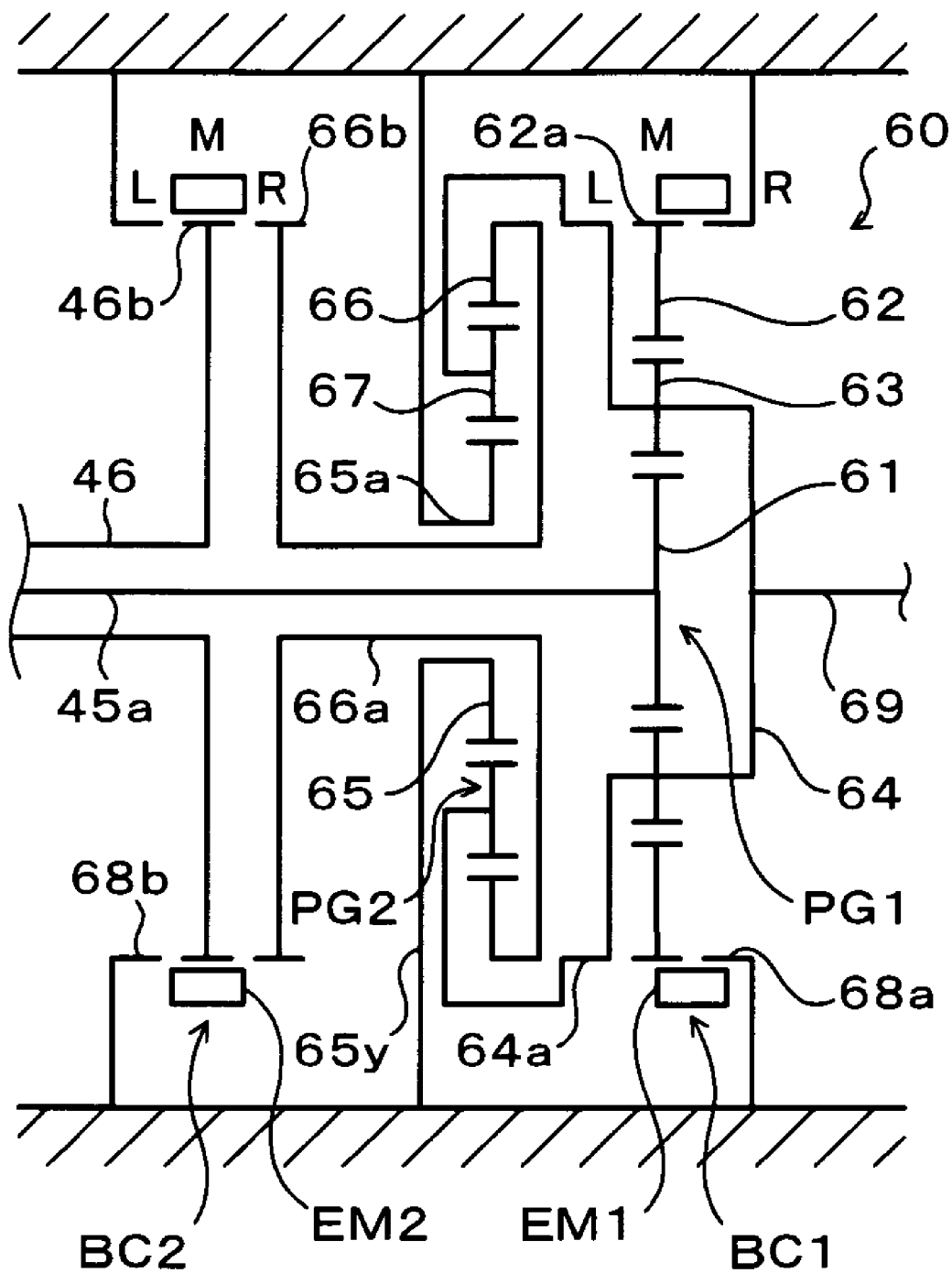
FIG. 2 shows the schematic structure of a transmission 60 included in the hybrid vehicle 20 of the embodiment.

As shown in FIGS. 1 and 2, the first change speed planetary gear mechanism PG1 is constructed as a single pinion planetary gear mechanism and includes a sun gear 61 (input element) connected with the carrier shaft 45a, a ring gear 62 (fixable element) as an internal gear arranged coaxially with the sun gear 61, and a carrier 64 (output element) arranged to hold multiple pinion gears 63 engaging with both the sun gear 61 and the ring gear 62 and linked with the driveshaft 69. The sun gear 61, the ring gear 62, and the carrier 64 are designed as elements of differential rotations. The second change speed planetary gear mechanism PG2 is also constructed as a single pinion planetary gear mechanism and includes a sun gear 65 (fixable element), a ring gear 66 (input element) as an internal gear arranged coaxially with the sun gear 65, and the common carrier 64 (output element) arranged to hold multiple pinion gears 67 engaging with both the sun gear 65 and the ring gear 66 and shared with the first change speed planetary gear mechanism PG1. The sun gear 65, the ring gear 66, and the carrier 64 are designed as elements of differential rotations. In the structure of this embodiment, the second change speed planetary gear mechanism PG2 is arranged to be coaxial with and ahead of the first change speed planetary gear mechanism PG1 in the vehicle body. The sun gear 65 of the second change speed planetary gear mechanism PG2 is attached to a hollow sun gear shaft 65a fastened to the transmission case by means of a support member 65y. The sun gear 65 as the fixable element is thus continuously fixed in a non-rotatable manner. A hollow ring gear shaft 66a is located in and passed through the hollow sun gear shaft 65a. The ring gear 66 is attached to the ring gear shaft 66a at a position rearward of the sun gear 65 and the pinion gear 67 but forward of the first change speed planetary gear mechanism PG1 in the vehicle body. The carrier 64 is formed to be extended from outside of the ring gear 66 and go around to the forward of the pinion gears 67. The carrier shaft 45a is arranged to pass through the first motor shaft 46 and the ring gear shaft 66a. The sun gear 61 of the first change speed planetary gear mechanism PG1 is fastened to the end of the carrier shaft 45a extended from the ring gear shaft 66a.

The brake clutch BC1 is constructed as a dog clutch including a movable engaging member EM1 and an electromagnetic, electric, or hydraulic actuator 91 to move the movable engagement member EM1 back and forth in the axial direction of the carrier shaft 45a. The movable engaging member EM1 is designed to continuously engage with a mating engagement element 62a provided on a circumferential portion of the ring gear 62 of the first change speed planetary gear mechanism PG1 and to be engageable both with a lock element 68a fixed to the transmission case and with a mating engagement element 64a provided on a circumferential portion of the carrier 64. As shown in FIG. 2, the brake clutch BC1 is structured to selectively change over the clutch position or the position of the movable engaging member EM1 between multiple options 'R position', 'M position', and 'L position'. At the setting of the clutch position of the brake clutch BC1 to the R position, the movable engaging member EM1 engages with both the engagement element 62a of the ring gear 62 and the lock element 68a fixed to the transmission case. Such setting enables the ring gear 62 as the fixable element of the first change speed planetary gear mechanism PG1 to be fastened to the transmission case in a non-rotatable manner. At the setting of the clutch position of the brake clutch BC1 to the M position, the movable engaging member EM1 engages with only the engagement element 62a of the ring gear 62. Such setting releases the ring gear 62 of the first change speed planetary gear mechanism PG1 in a rotatable manner. At the setting of the clutch position of the brake clutch BC1 to the L position, the movable engaging member EM1 engages with both the engagement element 62a of the ring gear 62 and the engagement element 64a of the carrier 64. Such setting enables the ring gear 62 as the fixable element to be coupled with the carrier 64 as the output element in the first change speed planetary gear mechanism PG1. The brake clutch BC2 is also constructed as a dog clutch including a movable engaging member EM2 and an electromagnetic, electric, or hydraulic actuator 92 to move the movable engagement member EM2 back and forth in the axial direction of the first motor shaft 46. The movable engaging member EM2 is designed to continuously engage with a mating engagement element 46b provided on one end of the first motor shaft 46 (right end in the drawing) and to be engageable both with an engagement element 66b provided on one end of the ring gear shaft 66a (left end in the drawing) and a lock element 68b fixed to the transmission case. As shown in FIG. 2, the brake clutch BC2 is also structured to selectively change over the clutch position or the position of the movable engaging member EM2 between multiple options 'R position', 'M position', and 'L position'. At the setting of the clutch position of the brake clutch BC2 to the R position, the movable engaging member EM2 engages with both the engagement element 46b of the first motor shaft 46 and the engagement element 66b of the ring gear shaft 66a. Such setting enables the ring gear 66 of the second change speed planetary gear mechanism PG2 to be coupled with the sun gear 41 as the second element of the power distribution integration mechanism 40 via the ring gear shaft 66a, the first motor shaft 46, and the clutch C0. At the setting of the clutch position of the brake clutch BC2 to the M position, the movable engaging member EM2 engages with only the engagement element 46b of the first motor shaft 46. Such setting decouples the sun gear 41 of the power distribution integration mechanism 40 from the ring gear 66 of the second change speed planetary gear mechanism PG2. At the setting of the clutch position of the brake clutch BC2 to the L position, the movable engaging member EM2 engages with both the engagement element 46b of the first motor shaft 46 and the lock element 68b fixed to the transmission case. In the engaged state of the first motor shaft 46 or the clutch C0, such setting fastens the sun gear 41 of the power distribution integration mechanism 40 to the transmission case in a non-rotatable manner.

Figure 3:
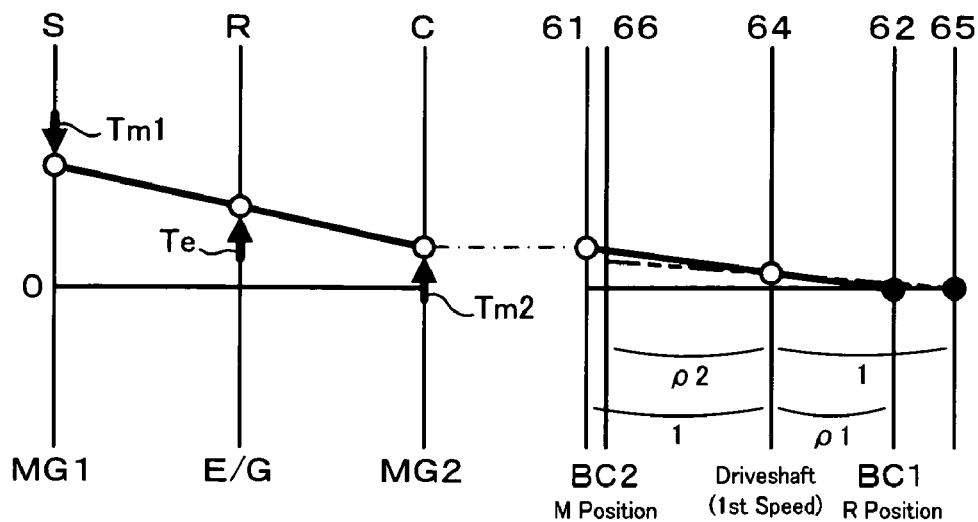
FIG. 3 shows torque-rotation speed dynamics of primary elements included in a power distribution integration mechanism 40 and in the transmission 60 in one change speed state in the transmission 60 during a drive of the hybrid vehicle 20 with engagement of a clutch C0 and operation of an engine 22.

The power transmitted from the carrier 64 of the transmission 60 to the driveshaft 69 is eventually output through a differential gear DF to rear wheels RWa and RWb as drive wheels. The transmission 60 of the above structure enables significant size reduction both in the axial direction and in a radial direction, compared with the parallel shaft-type transmission. The first change speed planetary gear mechanism PG1 and the second change speed planetary gear mechanism PG2 are arranged coaxially with and in the downstream of the engine 22, the motors MG1 and MG2, and the power distribution integration mechanism 40. The transmission 60 constructed as described above desirably simplifies the bearing structure and reduces the number of bearings. In this embodiment, a gear ratio $\rho2$ (number of teeth of the sun gear 65/number of teeth of the ring gear 66) of the second change speed planetary gear mechanism PG2 is set slightly greater than a gear ratio $\rho1$ (number of teeth of the sun gear 61/number of teeth of the ring gear 62) of the first change speed planetary gear mechanism PG1 (see FIG. 3). The gear ratios $\rho1$ and $\rho2$ of the first and the second change speed planetary gear mechanisms PG1 and PG2 may be set to arbitrary values.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch (start switch) 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 87. The hybrid electronic control unit 70 communicates with the engine ECU 24, the motor ECU 30, and the battery ECU 36 via the communication port to transmit diverse control signals and data to and from the engine ECU 24, the motor ECU 30, and the battery ECU 36, as mentioned previously. The hybrid electronic control unit 70 also controls clutch C0 and actuator 90-92 of brake clutches BC1 and BC2 of transmission 60.

The operations of the hybrid vehicle 20 are described below with reference to FIGS. 3 through 12. During a drive of the hybrid vehicle 20 in respective change speed states of FIGS. 3 to 8, under comprehensive control of the hybrid ECU 70 based on the driver's depression amount of an accelerator pedal 83 and the vehicle speed V, the engine 22 is controlled by the engine ECU 24, the motors MG1 and MG2 are controlled by the motor ECU 30, and the actuators 90 to 92 (the clutch C0 and the brake clutches BC1 and BC2 of the transmission 60) are directly controlled by the hybrid ECU 70. In the drawings of FIGS. 3 through 8, an S-axis represents a rotation speed of the sun gear 41 in the power distribution integration mechanism 40 (equivalent to a rotation speed Nm1 of the motor MG1 or the first motor shaft 46). An R-axis represents a rotation speed of the ring gear 42 in the power distribution integration mechanism 40 (equivalent to a rotation speed Ne of the engine 22). A C-axis represents a rotation speed of the carrier 45 in the power distribution integration mechanism 40 (equivalent to a rotation speed of the carrier shaft 45a). A 61-axis represents a rotation speed of the sun gear 61 in the first change speed planetary gear mechanism PG1 of the transmission 60. A 66-axis represents a rotation speed of the ring gear 66 in the second change speed planetary gear mechanism PG2. A 64-axis represents a rotation speed of the carrier 64 in the transmission 60 (equivalent to a rotation speed of the driveshaft 69). A 62-axis represents a rotation speed of the ring gear 62 in the first change speed planetary gear mechanism PG1. A 65-axis represents a rotation speed of the sun gear 65 in the second change speed planetary gear mechanism PG2.

Figure 4:
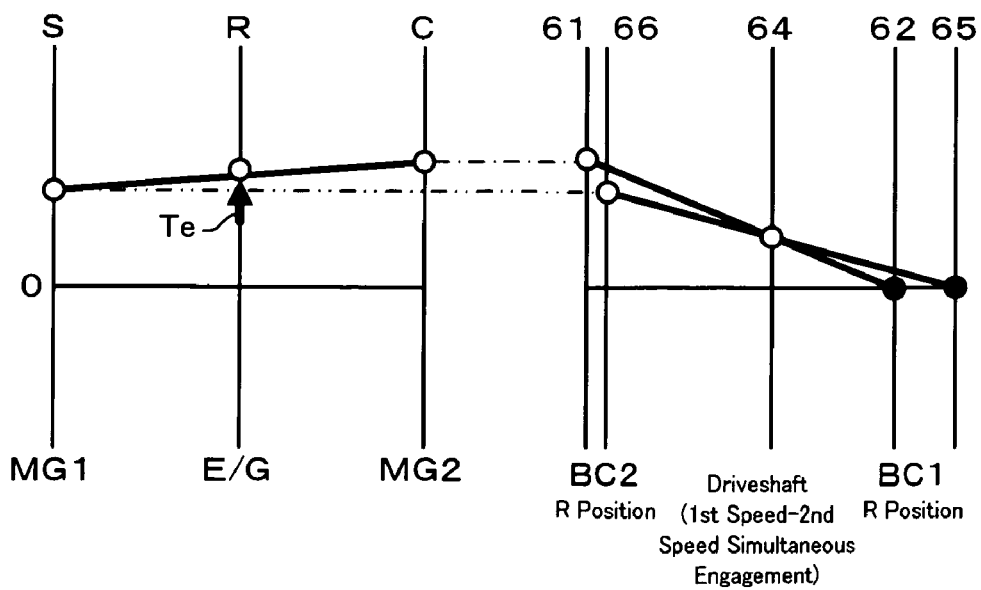
FIG. 4 shows torque-rotation speed dynamics in another change speed state.
Figure 5:
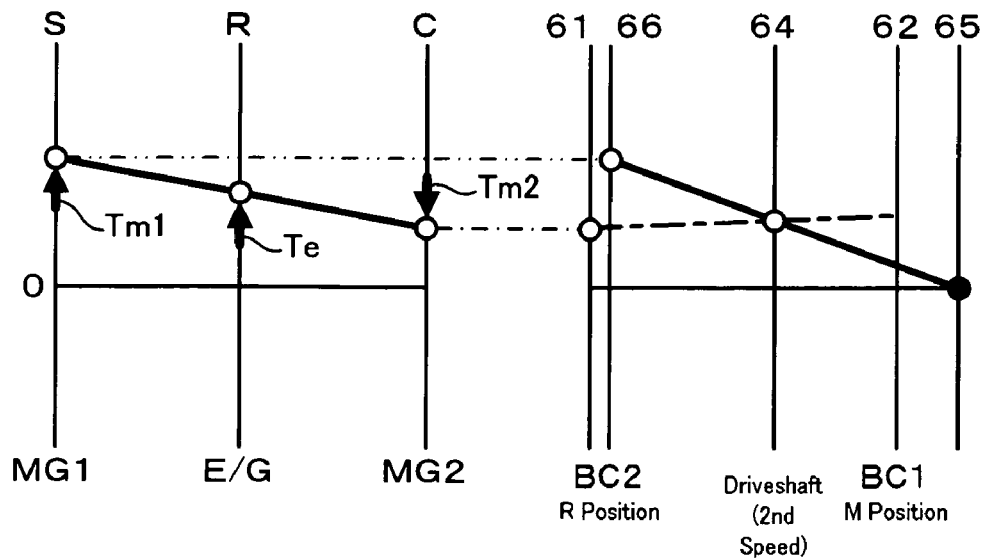
FIG. 5 shows torque-rotation speed dynamics in another change speed state.

During a drive of the hybrid vehicle 20 with engagement of the clutch C0 and operation of the engine 22, the clutch position of the brake clutch BC1 is set to the R position to fix the ring gear 62 of the first change speed planetary gear mechanism PG1 to the transmission case in the non-rotatable manner, while the clutch position of the brake clutch BC2 is set to the M position to decouple the power distribution integration mechanism 40 (more specifically the sun gear 41) from the second change speed planetary gear mechanism PG2 (more specifically the ring gear 66). Such settings of the clutch positions set the transmission 60 in a first change speed state (first speed) shown in FIG. 3. In this first change speed state, the power of the carrier shaft 45a (the carrier 45) is subjected to speed change at a change gear ratio ($=\rho1/(1+\rho1)$) based on the gear ratio $\rho1$ of the first change speed planetary gear mechanism PG1 and is transmitted to the driveshaft 69. In the first change speed state of FIG. 3, on condition that the rotation speed Nm1 of the motor MG1 (equivalent to the rotation speed of the sun gear 41 and the rotation speed of the first motor shaft 46) is sufficiently close to the rotation speed of the ring gear 66 in the second change speed planetary gear mechanism PG2, while the clutch position of the brake clutch BC1 is kept at the R position to fix the ring gear 62 in the first change speed planetary gear mechanism PG1 in the non-rotatable manner, the clutch position of the brake clutch BC2 may be changed to the R position to couple the power distribution integration mechanism 40 (more specifically the sun gear 41) with the second change speed planetary gear mechanism PG2 (more specifically the ring gear 66) as shown in FIG. 4. In the description below, a mode of fixing the ring gear 62 of the first change speed planetary gear mechanism PG1 in the non-rotatable manner by means of the brake clutch BC1 and coupling the power distribution integration mechanism 40 (the sun gear 41) with the second change speed planetary gear mechanism PG2 (the ring gear 46) by means of the brake clutch BC2 is referred to as 'simultaneous engagement mode'. The state of FIG. 4 is specifically called '$1^{st}$ speed-$2^{nd}$ speed simultaneous engagement state'. Setting torque commands of the motors MG1 and MG2 to 0 in this $1^{st}$ speed-$2^{nd}$ speed simultaneous engagement state causes the motors MG1 and MG2 to run idle without performing either power operation or regenerative operation. The output power (torque) of the engine 22 is thus mechanically (directly) transmitted at a first fixed change gear ratio $\gamma 1$ ($=(1-\rho)\cdot\rho 1/(1+\rho 1)+\rho/(1+\rho 2)$) to the driveshaft 69 without conversion into electrical energy. In the $1^{st}$ speed-$2^{nd}$ speed simultaneous engagement state of FIG. 4, while the clutch position of the brake clutch BC2 is kept at the R position to keep the sun gear 41 of the power distribution integration mechanism 40 coupled with the ring gear 66 of the second change speed planetary gear mechanism PG2, the clutch position of the brake clutch BC1 may be changed to the M position to release the ring gear 62 of the first change speed planetary gear mechanism PG1 in the rotatable manner. Such settings of the clutch positions set the transmission 60 in a second change speed state (second speed) allowing only transmission of the power by the second change speed planetary gear mechanism PG2 as shown in FIG. 5. In this second change speed state, the power of the first motor shaft 46 (the sun gear 41) is subjected to speed change at a change gear ratio ($=1/(1+\rho 2)$) based on the gear ratio $\rho 2$ of the second change speed planetary gear mechanism PG2 and is transmitted to the driveshaft 69.

Figure 6:
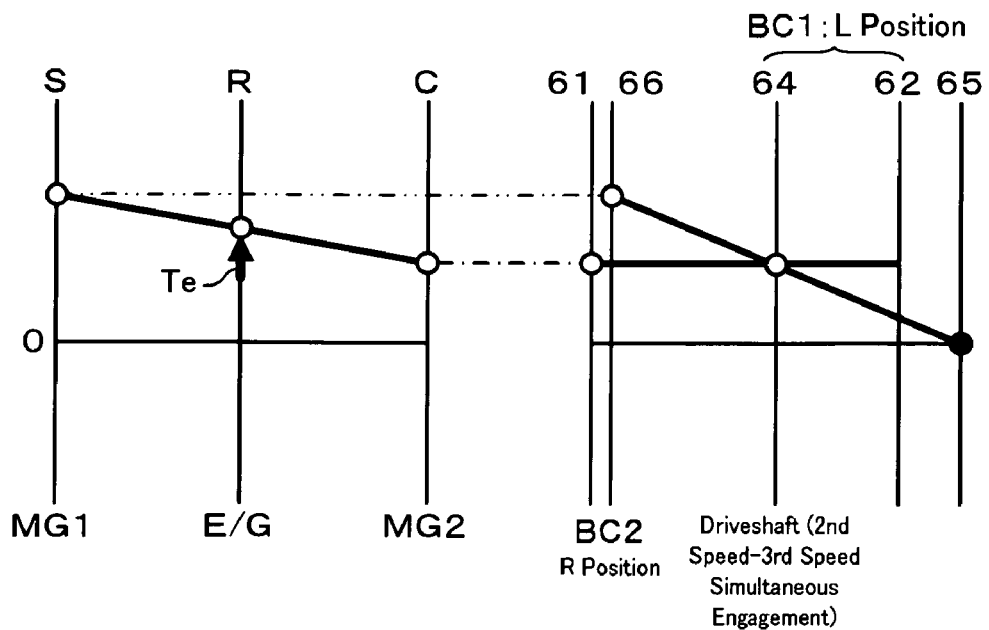
FIG. 6 shows torque-rotation speed dynamics in another change speed state.
Figure 7:
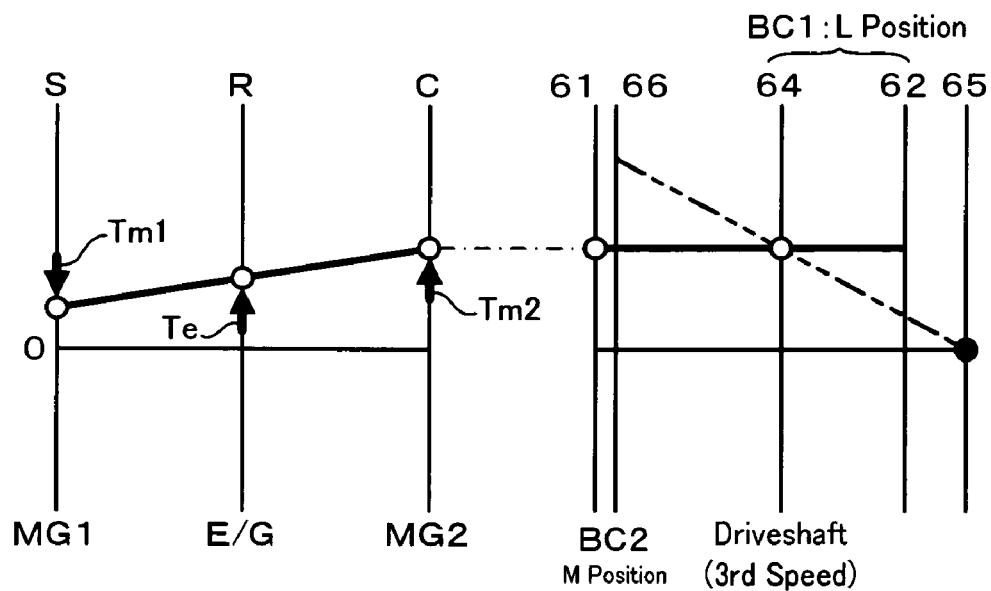
FIG. 7 shows torque-rotation speed dynamics in another change speed state.

In the second change speed state of FIG. 5, on condition that the rotation speeds of the sun gear 61, the ring gear 62, and the carrier 64 of the first change speed planetary gear mechanism PG1 are almost equal to one another to allow substantially integral rotations of these elements 61, 62, and 64, the clutch position of the brake clutch BC1 may be changed to the L position to couple the ring gear 62 of the first change speed planetary gear mechanism PG1 with the carrier 64 as shown in FIG. 6. In the description below, a mode of coupling the ring gear 62 of the first change speed planetary gear mechanism PG1 with the carrier 64 by means of the brake clutch BC1 while keeping the power distribution integration mechanism 40 (the sun gear 41) coupled with the second change speed planetary gear mechanism PG2 (the ring gear 66) by means of the brake clutch BC2 is also referred to as the 'simultaneous engagement mode'. The state of FIG. 6 is specifically called '$2^{nd}$ speed-$3^{rd}$ speed simultaneous engagement state'. Setting torque commands of the motors MG1 and MG2 to 0 in this $2^{nd}$ speed-$3^{rd}$ speed simultaneous engagement state causes the motors MG1 and MG2 to run idle without performing either power operation or regenerative operation. The output power (torque) of the engine 22 is thus mechanically (directly) transmitted at a second fixed change gear ratio $\gamma 2$ ($=1-\rho+\rho/(1+\rho 2)$) to the driveshaft 69 without conversion into electrical energy. In the $2^{nd}$ speed-$3^{rd}$ speed simultaneous engagement state of FIG. 6, the clutch position of the brake clutch BC2 may be changed to the M position to release the ring gear 66 in the second change speed planetary gear mechanism PG2 in the rotatable manner. Such setting of the clutch position sets the transmission 60 in a third change speed state (third speed) as shown in FIG. 7. In this third change speed state, the function of the brake clutch BC1 substantially locks the sun gear 61, the ring gear 62, and the carrier 64 in the first change speed planetary gear mechanism PG1 to allow integral rotations of these elements 61, 62, and 64. The power of the carrier 45 in the power distribution integration mechanism 40 is thus directly transmitted at a change gear ratio of 1 to the driveshaft 69 via the carrier shaft 45a and the integrally rotating elements of the first change speed planetary gear mechanism PG1 as shown in FIG. 7. In the third change speed state, the ratio of the rotation speed of the engine 22 to the rotation speed of the driveshaft 69 directly linked with the carrier 45 as the output element is varied continuously in a stepless manner by controlling the rotation speed of the motor MG1.

Figure 8:
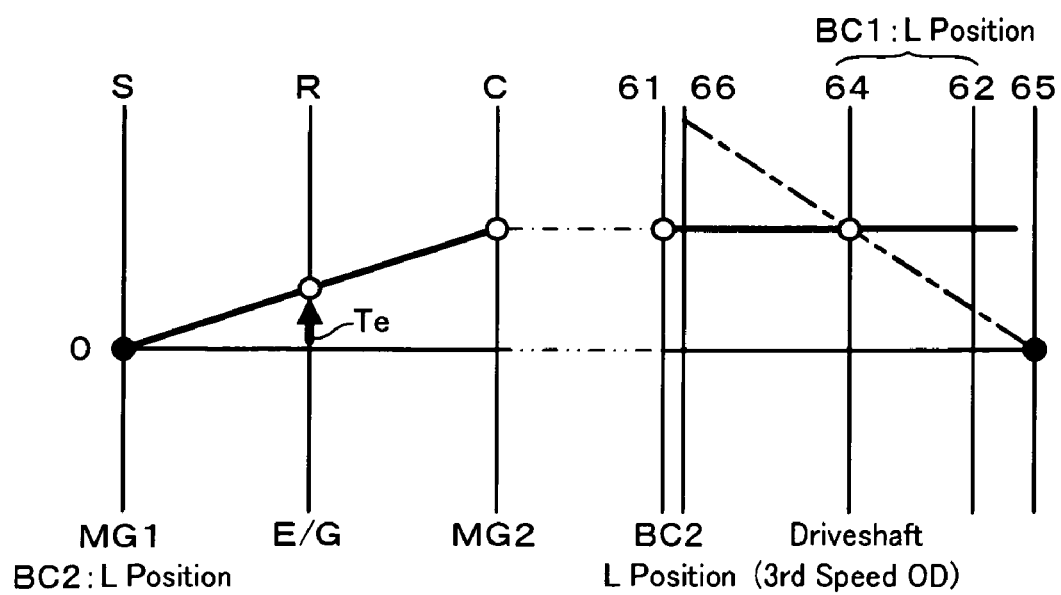
FIG. 8 shows torque-rotation speed dynamics in another change speed state.

In the third change speed state of FIG. 7, on condition that the rotation speeds of the motor MG1, the first motor shaft 46, the sun gear 41 of the power distribution integration mechanism 40, and the sun gear 61 of the first change speed planetary gear mechanism PG1 approach to 0, the clutch position of the brake clutch BC2 may be changed to the L position to fix the sun gear 41 as the second element of the power distribution integration mechanism 40 in the non-rotatable manner via the lock element 68b, the engagement element 46b, and the first motor shaft 46 as shown in FIG. 8. In the description below, a mode of fixing the first motor shaft 46 (the motor MG1) in the non-rotatable manner by means of the brake clutch BC2 while keeping the ring gear 62 coupled with the carrier 64 by means of the brake clutch BC1 to substantially lock the first change speed planetary gear mechanism PG1 in the transmission 60 is also referred to as the 'simultaneous engagement mode'. The state of FIG. 8 is specifically called '$3^{rd}$ speed OD (overdrive) state'. Setting the torque commands of the motors MG1 and MG2 to 0 in this $3^{rd}$ speed OD state causes the motors MG1 and MG2 to run idle without performing either power operation or regenerative operation. The output power (torque) of the engine 22 is thus directly transmitted to the driveshaft 69 with speed change (speed increase) at a third fixed change gear ratio $\gamma 3$ ($=1/(1-\rho)$) of less than 1 without conversion into electrical energy. The change gear ratio of the transmission 60 may be shifted down according to the procedure reverse to the above description.

Figure 9:
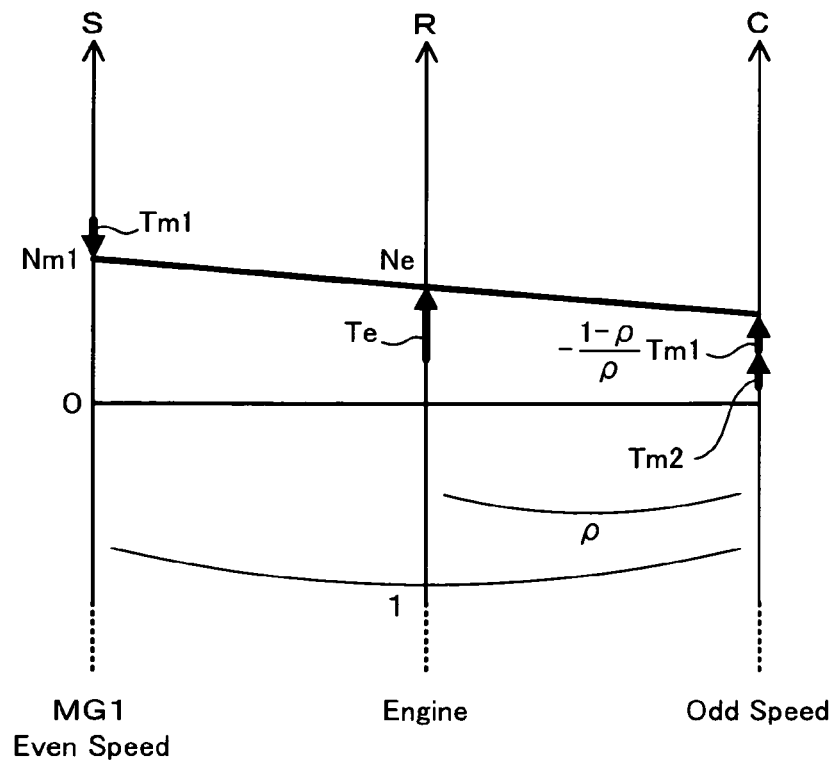
FIG. 9 is an alignment chart showing torque-rotation speed dynamics of respective elements in the power distribution integration mechanism 40 in a state of operating a motor MG1 as a generator and a motor MG2 as a motor.

During the drive of the hybrid vehicle 20 with operation of the engine 22, at the setting of the speed in the transmission 60 to either the first change speed state or the third change speed state, the motors MG1 and MG2 may be driven and controlled to make the motor MG2, which connects with the carrier 45 of the power distribution integration mechanism 40 working as the output element, function as the motor and to make the motor MG1, which connects with the sun gear 41 working as the reactive element, function as the generator. In this state, the power distribution integration mechanism 40 distributes the power of the engine 22 input via the ring gear 42 at its gear ratio $\rho$ into the sun gear 41 and the carrier 45, while integrating the power of the engine 22 with the power of the motor MG2 functioning as the motor and outputting the integrated power to the carrier 45. In the description below, a mode of making the motor MG1 function as the generator and making the motor MG2 function as the motor is referred to as 'first torque conversion mode'. In the first torque conversion mode, the power of the engine 22 goes through torque conversion by means of the power distribution integration mechanism 40 and the motors MG1 and MG2 and is then output to the carrier 45. The ratio of the rotation speed Ne of the engine 22 to the rotation speed of the carrier 45 as the output element is varied continuously in a stepless manner by controlling the rotation speed of the motor MG1. FIG. 9 is an alignment chart showing torque-rotation speed dynamics of the respective elements in the power distribution integration mechanism 40 in the first torque conversion mode. The S-axis, the R-axis, and the C-axis in FIG. 9 represent the same meanings as those in FIGS. 3 through 8. In the alignment chart of FIG. 9, $\rho$ denotes the gear ratio of the power distribution integration mechanism 40 (number of teeth of the sun gear 41/number of teeth of the ring gear 42). In FIG. 9, values above a O-axis (horizontal axis) and values below the O-axis respectively show positive rotation speeds and negative rotation speeds on the S-axis, the R-axis, and the C-axis. Thick arrows on the axes represent torques applied to the corresponding elements; upward arrows show application of positive torques and downward arrows show application of negative torques. These definitions are similarly applied to the alignment charts of FIGS. 3 through 8 explained above and the alignment charts of FIGS. 10 and 11 explained later.

Figure 10:
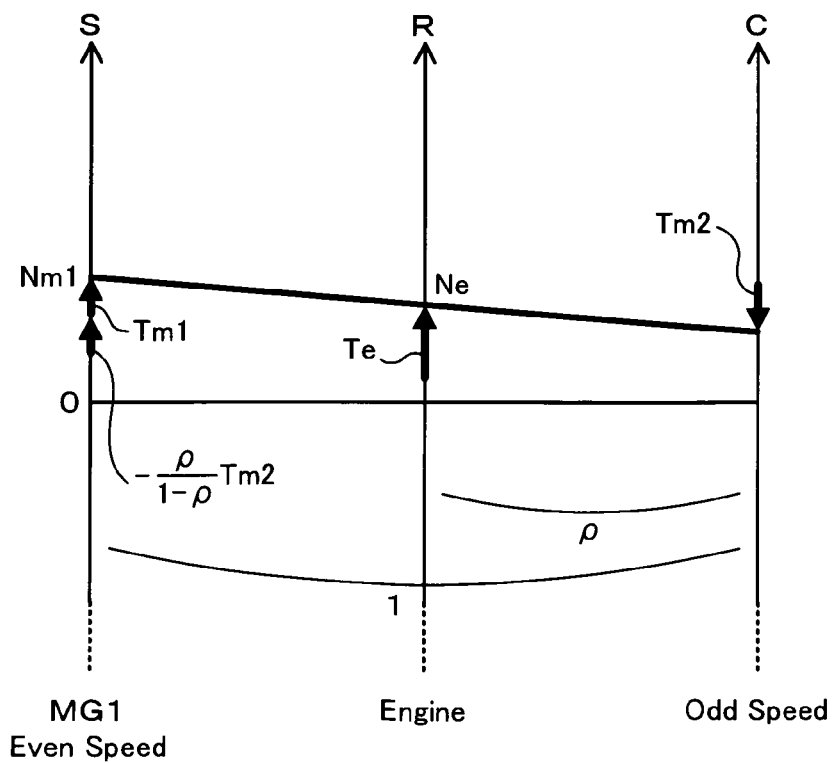
FIG. 10 is an alignment chart showing torque-rotation speed dynamics of the respective elements in the power distribution integration mechanism 40 in a state of operating the motor MG2 as a generator and the motor MG1 as a motor.

During the drive of the hybrid vehicle 20 with operation of the engine 22, at the setting of the speed in the transmission 60 to the second change speed state, the motors MG1 and MG2 may be driven and controlled to make the motor MG1, which connects with the sun gear 41 of the power distribution integration mechanism 40 working as the output element, function as the motor and to make the motor MG2, which connects with the carrier 45 working as the reactive element, function as the generator. In this state, the power distribution integration mechanism 40 distributes the power of the engine 22 input via the ring gear 42 at its gear ratio ρ into the sun gear 41 and the carrier 45, while integrating the power of the engine 22 with the power of the motor MG1 functioning as the motor and outputting the integrated power to the sun gear 41. In the description below, a mode of making the motor MG2 function as the generator and making the motor MG1 function as the motor is referred to as 'second torque conversion mode'. In the second torque conversion mode, the power of the engine 22 goes through torque conversion by means of the power distribution integration mechanism 40 and the motors MG1 and MG2 and is then output to the sun gear 41. The ratio of the rotation speed Ne of the engine 22 to the rotation speed of the sun gear 41 as the output element is varied continuously in a stepless manner by controlling the rotation speed of the motor MG2. FIG. 10 is an alignment chart showing torque-rotation speed dynamics of the respective elements in the power distribution integration mechanism 40 in the second torque conversion mode.

In the hybrid vehicle 20 of the embodiment, the first torque conversion mode and the second torque conversion mode are alternately switched over with a change of the change speed state (change gear ratio) in the transmission 60. Such switchover prevents the rotation speed Nm1 or Nm2 of the motor MG1 or MG2 functioning as the generator from having a negative value with an increase in rotation speed Nm2 or Nm1 of the motor MG2 or MG1 functioning as the motor. This arrangement of the hybrid vehicle 20 effectively prevents the occurrence of power circulation in the first torque conversion mode, as well as the occurrence of power circulation in the second torque conversion mode. The power circulation in the first torque conversion mode is triggered by the negative rotation speed of the motor MG1 and causes the motor MG2 to consume part of the power output to the carrier shaft 45a and generate electric power, while causing the motor MG1 to consume the electric power generated by the motor MG2 and output driving power. The power circulation in the second torque conversion mode is triggered by the negative rotation speed of the motor MG2 and causes the motor MG1 to consume part of the power output to the first motor shaft 46 and generate electric power, while causing the motor MG2 to consume the electric power generated by the motor MG1 and output driving power. Such prevention of the power circulation desirably improves the power transmission efficiency in a wider drive range. The prevention of the power circulation also reduces the maximum required rotation speeds of the motors MG1 and MG2 and thereby enables size reduction of the motors MG1 and MG2. In the hybrid vehicle 20 of the embodiment, the output power of the engine 22 is mechanically (directly) transmittable to the driveshaft 69 at the first through the third fixed change gear ratios γ1 through γ3 uniquely set for the $1^{st}$ speed-$2^{nd}$ speed simultaneous engagement state, the $2^{nd}$ speed-$3^{rd}$ speed simultaneous engagement state, and the $3^{rd}$ speed OD state. This arrangement desirably increases the potential for mechanical output of the power from the engine 22 to the driveshaft 69 without conversion into electrical energy and thereby further enhances the power transmission efficiency in the wider drive range. In a general power output apparatus equipped with an engine, two motors, and a differential rotation mechanism such as a planetary gear mechanism, the relatively large reduction gear ratio between the engine and a driveshaft increases the potential for conversion of the engine output power into electrical energy. This undesirably decreases the power transmission efficiency and tends to cause heat generation in the motors MG1 and MG2. The simultaneous engagement mode described above is thus especially advantageous for the relatively large reduction gear ratio between the engine 22 and the driveshaft 69.

Figure 11:
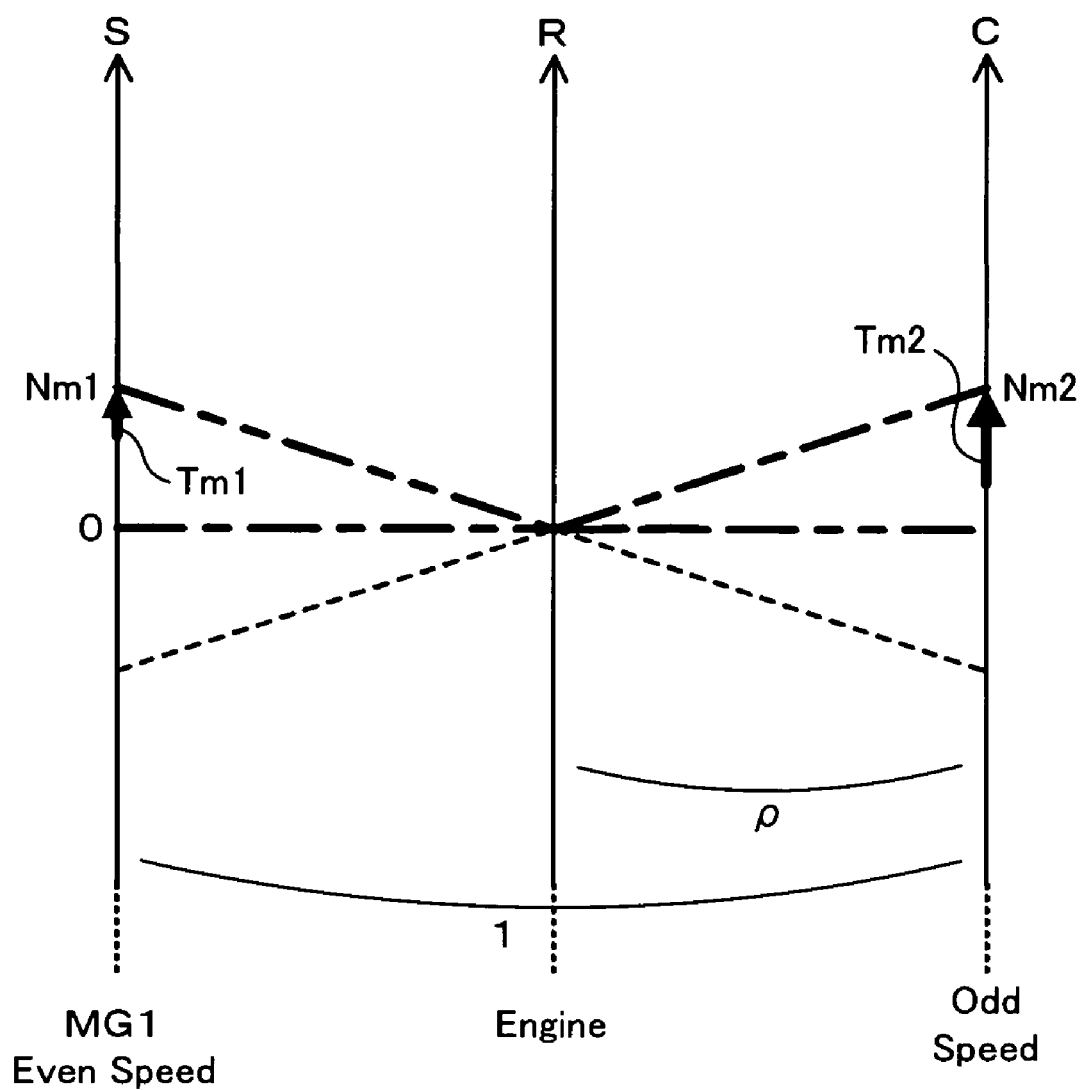
FIG. 11 shows a motor drive mode of the hybrid vehicle 20.

The hybrid vehicle 20 may be driven in a motor drive mode, where at least one of the motors MG1 and MG2 is driven with supply of electric power from the battery 35 to output driving power, while the engine 22 is at a stop as shown in FIG. 11. In the hybrid vehicle 20 of the embodiment, the motor drive mode includes three primary modes, a clutch-engaged one-motor drive mode, a clutch-released one-motor drive mode, and a two-motor drive mode. In the clutch-engaged one-motor drive mode, in the engaged position of the clutch C0, the transmission 60 is set to the first change speed state or the third change speed state to allow the power output from only the motor MG2 or is set to the second change speed state to allow the power output from only the motor MG1. In the clutch-engaged one-motor drive mode, the clutch C0 is set to connect the sun gear 41 of the power distribution integration mechanism 40 with the first motor shaft 46. The motor MG1 or MG2 in the state of no power output thus follows the motor MG2 or MG1 in the state of power output to run idle as shown by the broken line in FIG. 11. In the clutch-released one-motor drive mode, in the released position of the clutch C0, the transmission 60 is set to one of the first change speed state, the third change speed state, and the $3^{rd}$ speed OD state to allow the power output from only the motor MG2 or is set to the second change speed state to allow the power output from only the motor MG1. In the clutch-released one-motor drive mode, the clutch C0 is released to disconnect the sun gear 41 from the first motor shaft 46. As shown by the one-dot chain line and the two-dot chain line in FIG. 11, such disconnection effectively avoids the follow of the crankshaft 26 of the engine 22 at the stop, as well as the follow of the motor MG1 or MG2 in the state of no power output, thus preventing a decrease in power transmission efficiency. In the two-motor drive mode, in the released position of the clutch C0, at least one of the motors MG1 and MG2 is driven and controlled after the transmission 60 is set in either of the $1^{st}$ speed-$2^{nd}$ speed simultaneous engagement state and the $2^{nd}$ speed-$3^{rd}$ speed simultaneous engagement state by means of the brake clutches BC1 and BC2. Such setting and drive control effectively avoids the follow of the engine 22 and enables the power output from both the motors MG1 and MG2 and transmission of a large driving power to the driveshaft 69 in the motor drive mode. This two-motor drive mode is especially suitable for a hill start and ensures the favorable towing performance during the motor drive of the hybrid vehicle 20.

In the hybrid vehicle 20 of the embodiment, in the clutch-released one-motor drive mode, the change speed state (change gear ratio) of the transmission 60 is readily changeable to enable the efficient power transmission to the driveshaft 69. For example, in the released position of the clutch C0, the transmission 60 may be set in the first change speed state to allow the power output from only the motor MG2 through fixation of the ring gear 62 of the first change speed planetary gear mechanism PG1 to the transmission case by means of the brake clutch BC1. In order to shift up the change gear ratio of the transmission 60 from this state, the rotation speed Nm1 of the motor MG1 is synchronized with the rotation speed of the ring gear 66 in the second change speed planetary gear mechanism PG2. The brake clutch BC2 is then set to couple the ring gear 66 of the second change speed planetary gear mechanism PG2 with the sun gear 41 as the second element of the power distribution integration mechanism 40. This shifts the transmission 60 from the first change speed state to the $1^{st}$ speed-$2^{nd}$ speed simultaneous engagement state. The clutch position of the brake clutch BC1 is subsequently changed to the M position to release the ring gear 62 of the first change speed planetary gear mechanism PG1 in the rotatable manner and to allow the power output from only the motor MG1. This shifts up the change gear ratio of the transmission 60 and sets the transmission 60 in the second change speed state (second speed). In the released position of the clutch C0, the transmission 60 may be set in the second change speed state to allow the power output from only the motor MG1. In order to shift up the change gear ratio of the transmission 60 from this state, the motor MG2 is driven and controlled to synchronize the rotation speed of the ring gear 62 in the first change speed planetary gear mechanism PG1 with the rotation speed of the carrier 64 (the driveshaft 69). The brake clutch BC1 is then set to couple the ring gear 62 of the first change speed planetary gear mechanism PG1 with the carrier 64. This shifts the transmission 60 from the second change speed state to the $2^{nd}$ speed-$3^{rd}$ speed simultaneous engagement state. The clutch position of the brake clutch BC2 is subsequently changed to the M position to release the ring gear 66 of the second change speed planetary gear mechanism PG2 in the rotatable manner and to allow the power output from only the motor MG2. This shifts up the change gear ratio of the transmission 60 and sets the transmission 60 in the third change speed state (third speed). An upshift of the change gear ratio from the third change speed state to the $3^{rd}$ speed OD state is similarly performed in the clutch-released one-motor drive mode. In the hybrid vehicle 20 of the embodiment, the transmission 60 is used to change the rotation speed of the carrier shaft 45a and the first motor shaft 46 and amplify the torque in the motor drive mode. This arrangement desirably reduces the maximum required torques of the motors MG1 and MG2 and thereby enables size reduction of the motors MG1 and MG2. In response to a shift change of the change gear ratio of the transmission 60 during the motor drive of the hybrid vehicle 20, the transmission 60 undergoes the simultaneous engagement mode or the two-motor drive mode. This arrangement effectively prevents a torque loss on the occasion of a shift change of the change gear ratio and ensures an extremely smooth shift change of the change gear ratio with causing no significant shock.

The change gear ratio of the transmission 60 may be shifted down in the motor drive mode according to the procedure basically reverse to the above description. In response to an increase in driving force demand or in response to a decrease in state of charge SOC of the battery 35 in the clutch-engaged one-motor drive mode, the motor MG1 or MG2 to be made into the state of no power output corresponding to the setting of the change gear ratio in the transmission 60 is driven and controlled to crank and start up the engine 22. In response to an increase in driving force demand or in response to a decrease in state of charge SOC of the battery 35 in the clutch-released one-motor drive mode, on the other hand, the motor MG1 or MG2 in the state of no power output is driven and controlled to synchronize its rotation speed Nm1 or Nm2 with the rotation speed of the sun gear 41 or with the rotation speed of the carrier 45 in the power distribution integration mechanism 40. After the clutch C0 is engaged, the motor MG1 or MG2 is subsequently driven and controlled to motor and start up the engine 22. The engine 22 can thus be started up with smooth power transmission to the driveshaft 69. At a startup of the engine 22 in the two-motor drive mode, after selection of one of the motors MG1 and MG2 as a motor of continuously outputting power corresponding to a target change gear ratio set in the transmission 60, power conversion is performed to transmit the power of the other motor MG2 or MG1 of not continuously outputting power to the one motor MG1 or MG2 of continuously outputting power. On completion of the power conversion, the clutch position of either the brake clutch BC2 or the brake clutch BC1 is changed to the M position to disconnect the other motor MG2 or MG1 of not continuously outputting power from the transmission 60. The other motor MG2 or MG1 is then driven and controlled to synchronize its rotation speed Nm2 or Nm1 with the rotation speed of the carrier 45 or with the rotation speed of the sun gear 41 in the power distribution integration mechanism 40. After the clutch C0 is engaged, the other motor MG2 or MG1 is driven and controlled to motor and start up the engine 22. The engine 22 can thus be started up with smooth power transmission to the driveshaft 69. FIG. 12 shows the settings of the clutch positions of the brake clutches BC1 and BC2 and the clutch C0 during the drive of the hybrid vehicle 20.

As described above, the hybrid vehicle 20 of the embodiment is equipped with the power distribution integration mechanism 40 constructed as the three element-type planetary gear mechanism having a gear ratio of approximately 0.5. The power distribution integration mechanism 40 of this structure is small-sized and enables the motors MG1 and MG2 to have identical specifications without requiring a reduction gear mechanism or any equivalent mechanism. This arrangement thus contributes to size reduction of the power output apparatus including the engine 22, the motors MG1 and MG2, the power distribution integration mechanism 40, and the transmission 60. The hybrid vehicle 20 of the embodiment is also equipped with the transmission 60 including the three element-type first change speed planetary gear mechanism PG1 and the three element-type second change speed planetary gear mechanism PG2. The transmission 60 is arranged coaxially with and in the downstream of the engine 22, the motors MG1 and MG2, and the power distribution integration mechanism 40. The structure of the transmission 60 enables size reduction both in the axial direction and in the radial direction, compared with the parallel shaft-type transmission. The combination of the power distribution integration mechanism 40 constructed as the three element-type planetary gear mechanism having the gear ratio of approximately 0.5 with the transmission 60 including the three element-type first change speed planetary gear mechanism PG1 and the three element-type second change speed planetary gear mechanism PG2 desirably downsizes the power output apparatus to be extremely favorable for mounting on the hybrid vehicle 20 having a rear wheel drive system as a main drive system with the rear drive wheels RWa and RWb. The power distribution integration mechanism 40 is constructed as the double pinion planetary gear mechanism including the ring gear 42 (third element), the sun gear 41 (second element), and the carrier 45 (first element) arranged to support multiple sets of the two intermeshing pinion gears 43 and 44 engaging with the ring gear 42 and with the sun gear 41 and is arranged to have the gear ratio ρ of approximately 0.5. This arrangement desirably reduces the outer diameter of the power distribution integration mechanism 40 and enables further size reduction of the whole power output apparatus.

In the structure of the transmission 60 of the embodiment, the brake clutch BC1 (first fixation structure) is set to fix the ring gear 62 as the fixable element of the first change speed planetary gear mechanism PG1 in the non-rotatable manner, while the brake clutch BC2 (transmission state changeover structure or the coupling-decoupling structure) is set to decouple the power distribution integration mechanism 40 (the sun gear 41) from the second change speed planetary gear mechanism PG2 (the ring gear 66) and disable the power transmission via the second change speed planetary gear mechanism PG2. In this first change speed state, such setting causes the carrier 45 of the power distribution integration mechanism 40 to work as the output element and enables the motor MG2 connecting with the carrier 45 to function as the motor, while enabling the motor MG1 connecting with the sun gear 41 working as the reactive element to function as the generator. The brake clutch BC1 is set to couple the ring gear 62 of the first change speed planetary gear mechanism PG1 with the carrier 64, while the brake clutch BC2 is set to release the ring gear 66 of the second change speed planetary gear mechanism PG2 in the rotatable manner. In this third change speed state, such setting causes the carrier 45 of the power distribution integration mechanism 40 to work as the output element and enables the motor MG2 connecting with the carrier 45 to function as the motor, while enabling the motor MG1 connecting with the sun gear 41 working as the reactive element to function as the generator. In the transmission 60 of the embodiment, the brake clutch BC1 is set to release the ring gear 62 of the first change speed planetary gear mechanism PG1 in the rotatable manner and disable the power transmission via the first change speed planetary gear mechanism PG1, while the brake clutch BC2 is set to couple the sun gear 41 of the power distribution integration mechanism 40 with the ring gear 66 of the second change speed planetary gear mechanism PG2 and enable the power transmission via the second change speed planetary gear mechanism PG2. In this second change speed state, such setting causes the sun gear 41 of the power distribution integration mechanism 40 to work as the output element and enables the motor MG1 connecting with the sun gear 41 to function as the motor, while enabling the motor MG2 connecting with the carrier 45 working as the reactive element to function as the generator. In the hybrid vehicle 20 of the embodiment, the clutch positions of the brake clutches BC1 and BC2 are adequately controlled to change the change speed state of the transmission 60. This arrangement effectively prevents the occurrence of power circulation that is triggered by the negative rotation speed of the motor MG1 or MG2 functioning as the generator in response to an increase in rotation speed of the motor MG2 or MG1 functioning as the motor.

In the structure of the transmission 60 of the embodiment, the brake clutch BC1 is set to fix the ring gear 62 of the first change speed planetary gear mechanism PG1 in the non-rotatable manner, while the brake clutch BC2 is set to couple the sun gear 41 of the power distribution integration mechanism 40 with the ring gear 66 of the second change speed planetary gear mechanism PG2 and enable the power transmission via the second change speed planetary gear mechanism PG2. In this $1^{st}$ speed-$2^{nd}$ speed simultaneous engagement state, such setting enables the power of the engine 22 to be mechanically (directly) transmitted to the driveshaft 69 at the first fixed change gear ratio γ1. The brake clutch BC1 (coupling structure) is set to couple the ring gear 62 (fixable element) of the first change speed planetary gear mechanism PG1 with the carrier 64 (output element), while the brake clutch BC2 is set to couple the sun gear 41 of the power distribution integration mechanism 40 with the ring gear 66 of the second change speed planetary gear mechanism PG2 and enable the power transmission via the second change speed planetary gear mechanism PG2. In this $2^{nd}$ speed-$3^{rd}$ speed simultaneous engagement state, such setting enables the power of the engine 22 to be mechanically (directly) transmitted to the driveshaft 69 at the second fixed change gear ratio γ2, which is different from the first fixed change gear ratio γ1 in the $1^{st}$ speed-$2^{nd}$ speed simultaneous engagement state of fixing the ring gear 62 of the first change speed planetary gear mechanism PG1 by means of the brake clutch BC1 and enabling the power transmission via the second change speed planetary gear mechanism PG2 by means of the brake clutch BC2. In the $2^{nd}$ speed-$3^{rd}$ speed simultaneous engagement state, setting the brake clutch BC2 to release the ring gear 66 of the second change speed planetary gear mechanism PG2 in the rotatable manner and disable the power transmission via the second change speed planetary gear mechanism PG2 causes the brake clutch BC1 to substantially lock and integrally rotate the sun gear 61, the ring gear 62, and the carrier 64 of the first change speed planetary gear mechanism PG1. In this third change speed state, such setting enables direct transmission of the power from the carrier 45 of the power distribution integration mechanism 40 to the driveshaft 69 at the change gear ratio of 1. In the third change speed state of coupling the ring gear 62 of the first change speed planetary gear mechanism PG1 with the carrier 64, the brake clutch BC2 (third fixation structure) is set to fix the sun gear 41 (reactive element) of the power distribution integration mechanism 40 connecting with the motor MG1 functioning as the generator in the non-rotatable manner. In this $3^{rd}$ speed OD state, such setting enables the power of the engine 22 to be subjected to the speed increase at the third fixed change gear ratio γ3 of less than 1 and to be directly transmitted to the driveshaft 69. The hybrid vehicle 20 of the embodiment accordingly has the improved power transmission efficiency in a wider drive range, thus ensuring the enhanced fuel efficiency and the improved driving performance.

The transmission 60 includes the single pinion first change speed planetary gear mechanism PG1 and the single pinion second change speed planetary gear mechanism PG2. The first change speed planetary gear mechanism PG1 has the sun gear 61 as the input element, the ring gear 62 as the fixable element, and the carrier 64 as the output element to support the multiple pinion gears 63 engaging with both the sun gear 61 and the ring gear 62. The second change speed planetary gear mechanism PG2 has the ring gear 66 as the input element, the sun gear 65 as the fixable element, and the common carrier 64 shared with the first change speed planetary gear mechanism PG1 and arranged to hold the multiple pinion gears 67 engaging with both the ring gear 66 and the sun gear 65. The construction of such single pinion planetary gear mechanisms as the first and the second change speed planetary gear mechanisms PG1 and PG2 desirably downsizes the transmission 60 and thereby the whole power output apparatus. In the structure of the embodiment, the sun gear 65 of the second change speed planetary gear mechanism PG2 is attached to the hollow sun gear shaft 65a. The ring gear 66 of the second change speed planetary gear mechanism PG2 is connectable with the sun gear 41 of the power distribution integration mechanism 40 (the first motor shaft 46) via the ring gear shaft 66a located in and passed through the hollow sun gear shaft 65a. This arrangement makes space for the support member 65y between the second change speed planetary gear mechanism PG2 and the brake clutch BC2 settable to couple the sun gear 41 of the power distribution integration mechanism 40 (the first motor shaft 46) with the ring gear shaft 66a (the ring gear 66) as shown in FIG. 2. This layout allows the ring gear 66 as the input element of the second change speed planetary gear mechanism PG2 to be coupled with the sun gear 41 of the power distribution integration mechanism 40, while the sun gear 65 as the fixable element of the second change speed planetary gear mechanism PG2 is fastened to the transmission case in the non-rotatable manner. The single brake clutch BC1 is used both as the first fixation structure to fix and release the ring gear 62 of the first change speed planetary gear mechanism PG1 and as the coupling structure to couple and decouple the ring gear 62 with and from the carrier 64. This arrangement desirably downsizes the transmission 60 and the whole power output apparatus, while simplifying the structure of the transmission 60 and the whole power output apparatus. Similarly the single brake clutch BC2 is used both as the coupling-decoupling structure to couple and decouple the sun gear 41 of the power distribution integration mechanism 40 with and from the ring gear 66 of the second change speed planetary gear mechanism PG2 and as the third fixation structure to fix the sun gear 41 of the power distribution integration mechanism 40 in the non-rotatable manner. This arrangement desirably downsizes the transmission 60 and the whole power output apparatus, while simplifying the structure of the transmission 60 and the whole power output apparatus. The functions of the brake clutches BC1 and BC2 may be separated into clutches having clutch functions and brakes having brake functions.

Figure 13:
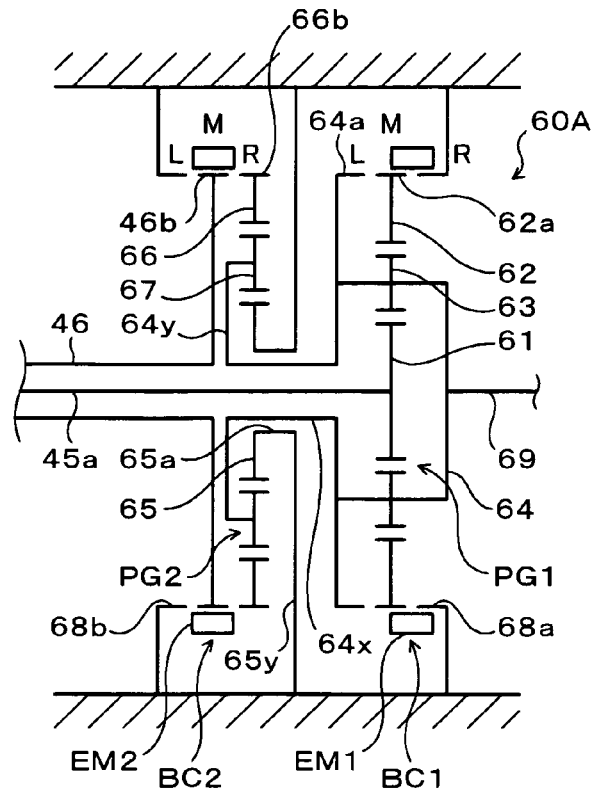
FIG. 13 shows the schematic structure of another transmission 60A in one modified example.

FIG. 13 shows the schematic structure of another transmission 60A applicable to the hybrid vehicle 20 of the embodiment described above. The transmission 60A of FIG. 13 includes single pinion-type first and second change speed planetary gear mechanisms PG1 and PG2 and brake clutches BC1 and BC2 similar to those in the transmission 60. In the transmission 60A, a sun gear 65 of the second change speed planetary gear mechanism PG2 is attached to a hollow sun gear shaft 65a fastened to the transmission case via a support member 65y. A common carrier 64 shared by the first and the second change speed planetary gear mechanisms PG1 and PG2 has a holder element 64y to hold multiple pinion gears 67 and a shaft element 64x located in and passed through the hollow sun gear shaft 65a. In the transmission 60A, the holder element 64y to hold the pinion gears 67 of the second change speed planetary gear mechanism PG2 is connected with the driveshaft 69 via the shaft element 64x located in and passed through the hollow sun gear shaft 65a. The holder element 64y is provided at a position of not interfering with the brake clutch BC2 settable to couple the sun gear 41 of the power distribution integration mechanism 40 (the first motor shaft 46) with the ring gear shaft 66a (the ring gear 66). This layout also makes space for the support member 65y between the second change speed planetary gear mechanism PG2 and the first change speed planetary gear mechanism PG1. In the transmission 60A of FIG. 13, the ring gear 66 as the input element of the second change speed planetary gear mechanism PG2 may be coupled with the sun gear 41 of the power distribution integration mechanism 40, while the sun gear 65 as the fixable element of the second change speed planetary gear mechanism PG2 is fastened to the transmission case in a non-rotatable manner.

Figure 14:
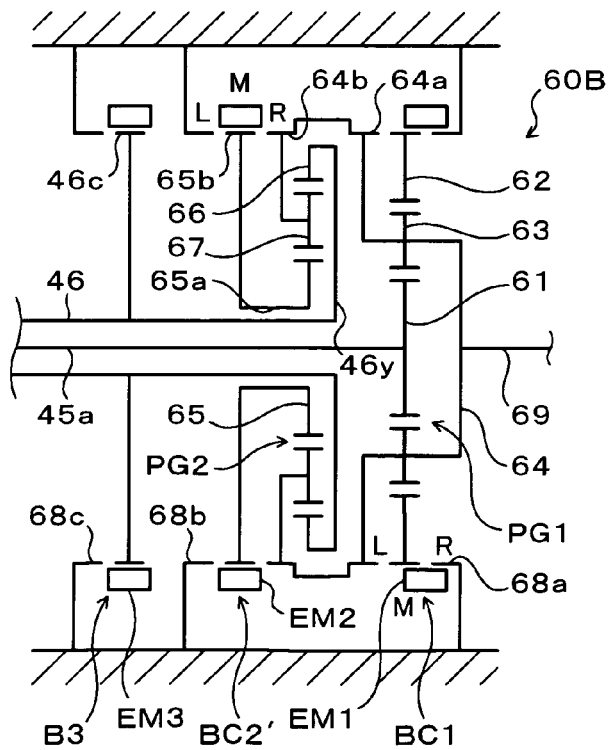
FIG. 14 shows the schematic structure of still another transmission 60B in another modified example.

FIG. 14 shows the schematic structure of still another transmission 60B applicable to the hybrid vehicle 20 of the embodiment described above. The transmission 60B of FIG. 14 includes a brake clutch BC2' and a brake B3, in addition to single pinion-type first and second change speed planetary gear mechanisms PG1 and PG2 and a brake clutch BC1 similar to those in the transmission 60. In the transmission 60B, a ring gear 66 as the input element of the second change speed planetary gear mechanism PG2 is attached to a mounting element 46y at a position rearward of the sun gear 65 and the pinion gears 67 but forward of the first change speed planetary gear mechanism PG1 in the vehicle body. The mounting element 46y is provided at one end of a first motor shaft 46 protruded from a hollow sun gear shaft 65a extended from a sun gear 65. A carrier 64 is formed to be extended from outside of the ring gear 66 and go around to the forward of the pinion gears 67. An engagement element 64b is formed on the circumference of the carrier 64 at a position forward of an engagement element 64a in the vehicle body. The brake B3 is constructed as a dog clutch including a movable engaging member EM3 and an electromagnetic, electric, or hydraulic actuator (not shown) to move the movable engagement member EM3 back and forth in the axial direction of the first motor shaft 46. The movable engaging member EM3 is designed to continuously engage with a mating engagement element 46c provided on one end of the first motor shaft 46 (right end in the drawing) and to be engageable with a lock element 68c fixed to the transmission case. Namely the brake B3 performs part of the functions of the brake clutch BC2 included in the transmission 60 described above to fix the sun gear 41 of the power distribution integration mechanism 40 to the transmission case in the non-rotatable manner. The brake B3 functioning as the third fixation structure may be designed to fix the carrier 45 as the first element of the power distribution integration mechanism 40 in the non-rotatable manner and may be separately provided from the transmission 60B.

The brake clutch BC2' is constructed as a dog clutch including a movable engaging member EM2 and an electromagnetic, electric, or hydraulic actuator (not shown) to move the movable engagement member EM2 back and forth in the axial direction of the first motor shaft 46. The movable engaging member EM2 is designed to continuously engage with a mating engagement element 65b provided on the sun gear shaft 65a extended from the sun gear 65 of the second change speed planetary gear mechanism PG2 and to be engageable both with a lock element 68b fixed to the transmission case and with the engagement element 64b provided on the circumference of the carrier 64. As shown in FIG. 14, the brake clutch BC2' is structured to selectively change over the clutch position or the position of the movable engaging member EM2 between multiple options 'R position', 'M position', and 'L position'. At the setting of the clutch position of the brake clutch BC2' to the L position, the movable engaging member EM2 engages with both the engagement element 65b of the sun gear shaft 65a and the lock element 68b fixed to the transmission case. Such setting causes the sun gear 65 as the fixable element of the second change speed planetary gear mechanism PG2 to be fastened to the transmission case in the non-rotatable manner and thereby enables the power transmission via the second change speed planetary gear mechanism PG2. At the setting of the clutch position of the brake clutch BC2' to the M position, the movable engaging member EM2 engages with only the engagement element 65b of the sun gear shaft 65a. Such setting releases the sun gear 65 of the second change speed planetary gear mechanism PG2 in the rotatable manner. While the brake clutch BC2 enables or disables the power input into the second change speed planetary gear mechanism PG2 (the ring gear 66), the brake clutch BC2' fixes the sun gear 65 as the fixable element of the second change speed planetary gear mechanism PG2 in the non-rotatable manner to enable the power transmission via the second change speed planetary gear mechanism PG2 or releases the sun gear 65 in the rotatable manner to disable the power transmission via the second change speed planetary gear mechanism PG2. At the setting of the clutch position of the brake clutch BC2' to the R position, the movable engaging member EM2 engages with both the engagement element 65b of the sun gear shaft 65a and the engagement element 64b of the carrier 64. Such setting enables the sun gear 65 as the fixable element to be coupled with the carrier 64 as the output element in the second change speed planetary gear mechanism PG2. FIG. 15 shows the settings of the clutch positions of the brake clutches BC1 and BC2', the brake B3, and the clutch C0 during the drive of the hybrid vehicle 20 equipped with the transmission 60B including the brake clutch BC2'.

As described above, the transmission 60B of FIG. 14 includes the brake clutch BC2' (second fixation structure and second coupling structure) arranged to couple and decouple the sun gear 65 as the fixable element of the second change speed planetary gear mechanism PG2 with and from the carrier 64, in addition to the brake clutch BC1 (first coupling structure) arranged to couple and decouple the ring gear 62 as the fixable element of the first change speed planetary gear mechanism PG1 with and from the carrier 64. In the transmission 60B of this modified example, the brake clutch BC2' is set to fix the sun gear 65 as the fixable element of the second change speed planetary gear mechanism PG2 to the transmission case in the non-rotatable manner and thereby enable the power transmission via the second change speed planetary gear mechanism PG2, while the brake clutch BC1 is set to couple the ring gear 62 of the first change speed planetary gear mechanism PG1 with the carrier 64. In this $2^{nd}$ speed-$3^{rd}$ speed simultaneous engagement state, such setting enables the power of the engine 22 to be mechanically (directly) transmitted to the driveshaft 69 at the second fixed change gear ratio γ2, which is different from the first fixed change gear ratio γ1 in the $1^{st}$ speed-$2^{nd}$ speed simultaneous engagement state of fixing the ring gear 62 of the first change speed planetary gear mechanism PG1 by means of the brake clutch BC1 and enabling the power transmission via the second change speed planetary gear mechanism PG2 by means of the brake clutch BC2'. In the $2^{nd}$ speed-$3^{rd}$ speed simultaneous engagement state, setting the brake clutch BC2' to release the sun gear 65 of the second change speed planetary gear mechanism PG2 in the rotatable manner and disable the power transmission via the second change speed planetary gear mechanism PG2 causes the brake clutch BC1 to substantially lock and integrally rotate the sun gear 61, the ring gear 62, and the carrier 64 of the first change speed planetary gear mechanism PG1. In this third change speed state, such setting enables direct transmission of the power from the carrier 45 of the power distribution integration mechanism 40 to the driveshaft 69 at the change gear ratio of 1. In the third change speed state, on condition that the rotation speeds of the sun gear 41 (the motor MG1), the ring gear 42 (the engine 22), and the carrier 45 (the motor MG2) of the power distribution integration mechanism 40 are almost equal to one another, while the brake clutch BC1 keeps the ring gear 62 as the fixable element of the first change speed planetary gear mechanism PG1 coupled with the carrier 64 as the output element, the brake clutch BC2' may couple the sun gear 65 as the fixable element of the second change speed planetary gear mechanism PG2 with the carrier 64 as the output element as shown in FIG. 16. In the description below, a mode of coupling the ring gear 62 of the first change speed planetary gear mechanism PG1 with the carrier 64 by means of the brake clutch BC1 while coupling the sun gear 65 of the second change speed planetary gear mechanism PG2 with the carrier 64 by means of the brake clutch BC2' is also referred to as the 'simultaneous engagement mode'. The state of FIG. 16 is specifically called 'equal rotation transmission state'. In this equal rotation transmission state, the sun gear 41, the ring gear 42 (the engine 22), and the carrier 45 of the power distribution integration mechanism 40, the sun gear 61 and the ring gear 62 of the first change speed planetary gear mechanism PG1, the sun gear 65 and the ring gear 66 of the second change speed planetary gear mechanism PG2, and the common carrier 64 shared by the first and second change speed planetary gear mechanisms PG1 and PG2 are integrally rotated as shown in FIG. 16. In the equal rotation transmission state, the output power of the engine 22 is thus mechanically (directly) transmitted at change gear ratio of 1 to the driveshaft 69. Namely the transmission 60B enables the output power of the engine 22 to be mechanically (directly) transmitted to the driveshaft 69 at the change gear ratio of 1 in the equal rotation transmission state of FIG. 16, which is different from the $1^{st}$ speed-$2^{nd}$ speed simultaneous engagement state, the $2^{nd}$ speed-$3^{rd}$ speed simultaneous engagement state, and the $3^{rd}$ speed OD state. The use of the transmission 60B thus ensures the enhanced power transmission efficiency in a wider drive range. The transmission 60B includes the single brake clutch BC2' functioning both as the second fixation structure to fix and release the sun gear 65 of the second change speed planetary gear mechanism PG2 and as the second coupling structure to couple and decouple the sun gear 65 with and from the carrier 64, in addition to the single brake clutch BC1 functioning both as the first fixation structure to fix and release the ring gear 62 of the first change speed planetary gear mechanism PG1 and as the first coupling structure to couple and decouple the ring gear 62 with and from the carrier 64. This arrangement desirably downsizes the transmission 60B and the whole power output apparatus, while simplifying the structure of the transmission 60B and the whole power output apparatus.

Figure 17:
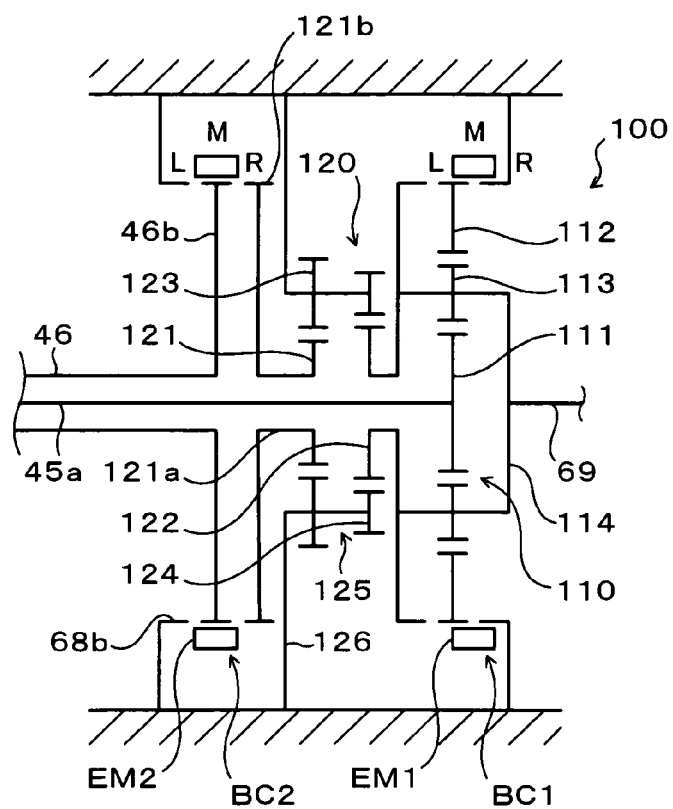
FIG. 17 shows the schematic structure of another transmission 100 in another modified example.

FIG. 17 shows the schematic structure of another transmission 100 applicable to the hybrid vehicle 20 of the embodiment described above. The transmission 100 shown in FIG. 17 includes a single pinion first change speed planetary gear mechanism 110, a second change speed planetary gear mechanism 120, and brake clutches BC1 and BC2. The first change speed planetary gear mechanism 110 includes a sun gear 111 as an input element, a ring gear 112 as a fixable element, and a carrier 114 as an output element arranged to hold pinion gears 113 engaging with the sun gear 111 and with the ring gear 112. The second change speed planetary gear mechanism 120 includes a first sun gear 121 as an input element, a second sun gear 122 as an output element arranged to have a different number of teeth from that of the first sun gear 121 and to connect with the carrier 114 of the first change speed planetary gear mechanism 110 and with the driveshaft 69, and a carrier 126 as a fixable element arranged to hold a stepped gear 125 of linking a first pinion gear 123 engaging with the first sun gear 121 to a second pinion gear 124 engaging with the second sun gear 122. In the transmission 100 of FIG. 17, the carrier 126 of the second change speed planetary gear mechanism 120 is fastened to the transmission case. The single brake clutch BC1 functions both as a fixation structure to fix and release the ring gear 112 of the first change speed planetary gear mechanism 110 and as a coupling structure to couple and decouple the ring gear 112 with and from the carrier 114. The brake clutch BC2 includes a movable engaging member EM2 and an electromagnetic, electric, or hydraulic actuator (not shown) to move the movable engagement member EM2 back and forth in the axial direction of the first motor shaft 46. The movable engaging member EM2 is designed to continuously engage with a mating engagement element 46b provided on one end of the first motor shaft 46 and to be engageable both with an engagement element 121b provided on a sun gear shaft 121a extended from the first sun gear 121 of the second change speed planetary gear mechanism 120 and with a lock element 68b fixed to the transmission case. The brake clutch BC2 of the transmission 100 couples the first sun gear 121 as the input element of the second change speed planetary gear mechanism 120 with the sun gear 41 as the second element of the power distribution integration mechanism 40 via the sun gear shaft 121a, the first motor shaft 46, and the clutch C0 to enable the power input into the second change speed planetary gear mechanism 120 (the first sun gear 121). The brake clutch BC2 also decouples the first sun gear 121 of the second change speed planetary gear mechanism 120 from the sun gear 41 as the second element of the power distribution integration mechanism 40 to disable the power input into the second change speed planetary gear mechanism 120 (the first sun gear 121). The combination of the single pinion first change speed planetary gear mechanism 110 with the second change speed planetary gear mechanism 120 arranged to include the stepped gear 125 and accordingly have a smaller dimension in the radial direction than the single pinion planetary gear mechanism desirably ensures size reduction of the transmission 100 especially in the radial direction.

Figure 18:
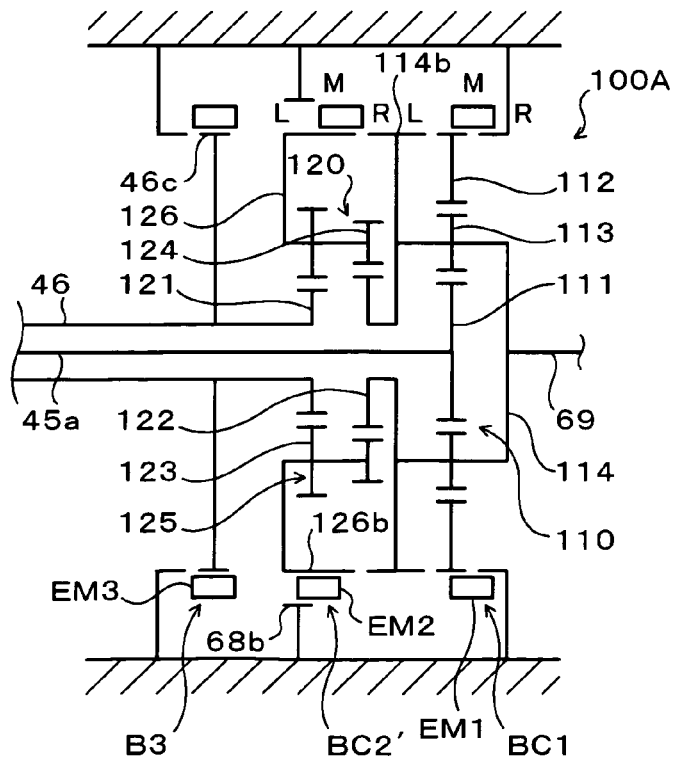
FIG. 18 shows the schematic structure of another transmission 100A in another modified example.

FIG. 18 shows the schematic structure of another transmission 100A applicable to the hybrid vehicle 20 of the embodiment described above. The transmission 100A shown in FIG. 18 includes a brake B3 and a brake clutch BC2', in addition to the first change speed planetary gear mechanism 110, the second change speed planetary gear mechanism 120, and the brake clutch BC1 similar to those included in the transmission 100 described above with reference to FIG. 17. In the transmission 100A, the carrier 126 as the fixable element of the second change speed planetary gear mechanism 120 has a substantially cylindrical circumferential part with an engagement element 126b formed thereon to continuously engage with a movable engaging element EM2 of the brake clutch BC2'. The movable engaging element EM2 of the brake clutch BC2' is arranged to be engageable both with an engagement element 114b provided on the carrier 114 of the first change speed planetary gear mechanism 110 and with a lock element 68b fastened to the transmission case. As shown in FIG. 18, the brake clutch BC2' is structured to selectively change over the clutch position or the position of the movable engaging member EM2 between multiple options 'R position', 'M position', and 'L position'. In the transmission 100A, at the setting of the clutch position of the brake clutch BC2' to the L position, the movable engaging member EM2 engages with both the engagement element 126b of the carrier 126 in the second change speed planetary gear mechanism 120 and the lock element 68b fixed to the transmission case. Such setting causes the carrier 126 as the fixable element of the second change speed planetary gear mechanism 120 to be fastened to the transmission case in the non-rotatable manner and thereby enables the power transmission via the second change speed planetary gear mechanism 120. At the setting of the clutch position of the brake clutch BC2' to the M position, the movable engaging member EM2 engages with only the engagement element 126b of the carrier 126. Such setting releases the carrier 126 of the second change speed planetary gear mechanism 120 in the rotatable manner. Namely the brake clutch BC2' of the transmission 100A is configured to fix the carrier 126 as the fixable element of the second change speed planetary gear mechanism 120 in the non-rotatable manner and thereby enable the power transmission via the second change speed planetary gear mechanism 120 and to release the carrier 126 in the rotatable manner and thereby disable the power transmission via the second change speed planetary gear mechanism 120. At the setting of the clutch position of the brake clutch BC2' to the R position, the movable engaging element EM2 engages with both the engagement element 126b of the carrier 126 as the fixable element of the second change speed planetary gear mechanism 120 and the engagement element 114b of the carrier 114 in the first change speed planetary gear mechanism 110. Such setting couples the carrier 126 as the fixable element with the second sun gear 122 as the output element in the second change speed planetary gear mechanism 120. As in the transmission 60B described above, setting the clutch position of the brake clutch BC1 to the L position and the clutch position of the brake clutch BC2' to the R position sets the transmission 100A in the equal rotation transmission state.

Figure 19:
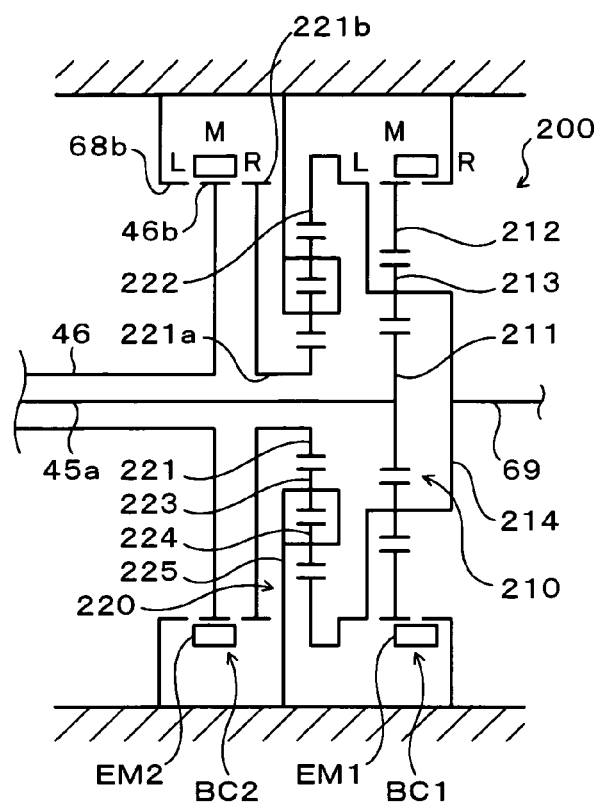
FIG. 19 shows the schematic structure of another transmission 200 in another modified example.

FIG. 19 shows the schematic structure of another transmission 200 applicable to the hybrid vehicle 20 of the embodiment described above. The transmission 200 shown in FIG. 19 includes a single pinion first change speed planetary gear mechanism 210, a double pinion second change speed planetary gear mechanism 220, and brake clutches BC1 and BC2. The first change speed planetary gear mechanism 210 includes a sun gear 211 as an input element, a ring gear 212 as a fixable element, and a carrier 214 as an output element arranged to hold pinion gears 213 engaging with the sun gear 211 and with the ring gear 212. The second change speed planetary gear mechanism 220 includes a sun gear 221 as an input element, a ring gear 222 as an output element arranged to connect with the carrier 214 of the first change speed planetary gear mechanism 210 and with the driveshaft 69, and a carrier 225 as a fixable element arranged to hold sets of two intermeshing pinion gears 223 and 224 engaging with the sun gear 221 and with the ring gear 222. In the transmission 200 shown in FIG. 19, the carrier 225 of the second change speed planetary gear mechanism 220 is fastened to the transmission case. The single brake clutch BC1 functions both as a fixation structure to fix and release the ring gear 212 of the first change speed planetary gear mechanism 210 and as a coupling structure to couple and decouple the ring gear 212 with and from the carrier 214. The brake clutch BC2 includes a movable engaging member EM2 and an electromagnetic, electric, or hydraulic actuator (not shown) to move the movable engagement member EM2 back and forth in the axial direction of the first motor shaft 46. The movable engaging member EM2 is designed to continuously engage with a mating engagement element 46b provided on one end of the first motor shaft 46 and to be engageable both with an engagement element 221b provided on a sun gear shaft 221a extended from the sun gear 221 of the second change speed planetary gear mechanism 220 and with a lock element 68b fixed to the transmission case. The brake clutch BC2 of the transmission 200 couples the sun gear 221 as the input element of the second change speed planetary gear mechanism 220 with the sun gear 41 as the second element of the power distribution integration mechanism 40 via the sun gear shaft 221a, the first motor shaft 46, and the clutch C0 to enable the power input into the second change speed planetary gear mechanism 220 (the sun gear 221). The brake clutch BC2 also decouples the sun gear 221 of the second change speed planetary gear mechanism 220 from the sun gear 41 as the second element of the power distribution integration mechanism 40 to disable the power input into the second change speed planetary gear mechanism 220 (the sun gear 221). The transmission 200 including the single pinion first change speed planetary gear mechanism 210 in combination with the double pinion second change speed planetary gear mechanism 220 has the similar functions and effects to those of the transmission 60 in the embodiment and those of the transmission 100 in the modified example described above.

Figure 20:
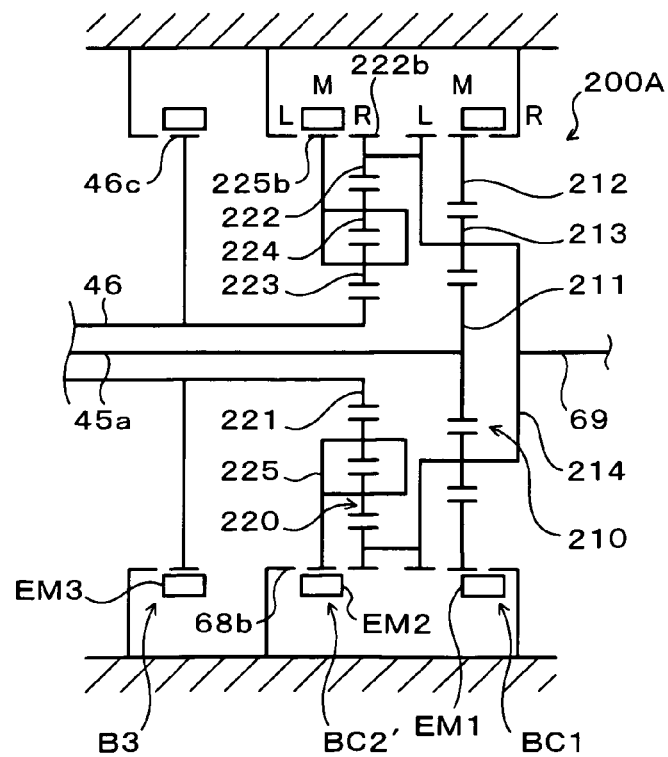
FIG. 20 shows the schematic structure of another transmission 200A in another modified example.

FIG. 20 shows the schematic structure of another transmission 200A applicable to the hybrid vehicle 20 of the embodiment described above. The transmission 200A shown in FIG. 20 includes a brake B3 and a brake clutch BC2', in addition to the single pinion first change speed planetary gear mechanism 210, the double pinion second change speed planetary gear mechanism 220, and the brake clutch BC1 similar to those included in the transmission 200 described above with reference to FIG. 19. In the transmission 200A, the carrier 225 as the fixable element of the second change speed planetary gear mechanism 220 has an engagement element 225b provided to continuously engage with a movable engaging member EM2 of the brake clutch BC2'. The movable engaging element EM2 of the brake clutch BC2' is arranged to be engageable both with an engagement element 222b provided on the ring gear 222 as the output element of the second change speed planetary gear mechanism 220 and with a lock element 68b fastened to the transmission case. As shown in FIG. 20, the brake clutch BC2' is structured to selectively change over the clutch position or the position of the movable engaging member EM2 between multiple options 'R position', 'M position', and 'L position'. In the transmission 200A, at the setting of the clutch position of the brake clutch BC2' to the L position, the movable engaging member EM2 engages with both the engagement element 225b of the carrier 225 in the second change speed planetary gear mechanism 220 and the lock element 68b fixed to the transmission case. Such setting causes the carrier 225 as the fixable element of the second change speed planetary gear mechanism 220 to be fastened to the transmission case in the non-rotatable manner and thereby enables the power transmission via the second change speed planetary gear mechanism 220. At the setting of the clutch position of the brake clutch BC2' to the M position, the movable engaging member EM2 engages with only the engagement element 225b of the carrier 225. Such setting releases the carrier 225 of the second change speed planetary gear mechanism 220 in the rotatable manner. Namely the brake clutch BC2' of the transmission 200A is configured to fix the carrier 225 as the fixable element of the second change speed planetary gear mechanism 220 in the non-rotatable manner and thereby enable the power transmission via the second change speed planetary gear mechanism 220 and to release the carrier 225 in the rotatable manner and thereby disable the power transmission via the second change speed planetary gear mechanism 220. At the setting of the clutch position of the brake clutch BC2' to the R position, the movable engaging element EM2 engages with both the engagement element 225b of the carrier 225 as the fixable element of the second change speed planetary gear mechanism 220 and the engagement element 222b of the ring gear 222 in the second change speed planetary gear mechanism 220. Such setting couples the carrier 225 as the fixable element with the ring gear 222 as the output element in the second change speed planetary gear mechanism 220. As in the transmissions 60B and 100A described above, setting the clutch position of the brake clutch BC1 to the L position and the clutch position of the brake clutch BC2' to the R position sets the transmission 200A in the equal rotation transmission state.

In the hybrid vehicle 20 of the embodiment, the clutch C0 is not restricted to the element of coupling and decoupling the sun gear 41 with and from the motor MG1. The clutch C0 may alternatively be arranged to couple and decouple the carrier 45 (first element) with and from the carrier shaft 45a (motor MG2) or may otherwise be arranged to couple and decouple the crankshaft 26 of the engine 22 with and from the ring gear 42 (third element). The hybrid vehicle 20 of the embodiment may be constructed as a rear wheel drive-based four wheel drive vehicle. In the embodiment and its modified examples described above, the power output apparatus is mounted on the hybrid vehicle 20. The power output apparatus of the invention is, however, not restrictively mounted on the hybrid vehicle, but may be mounted on diversity of moving bodies including various automobiles and other vehicles, boats and ships, and air craft or may be built in stationary equipment including construction machinery.

The primary elements in the embodiment and its modified examples are mapped to the primary constituents in the claims of the invention as described below. The engine 22, the motor MG2 arranged to enable power input and power output, the motor MG1 arranged to enable power input and power output, and the battery 35 arranged to enable transmission of electric power from and to the motors MG1 and MG2 in the embodiment and its modified examples are respectively equivalent to the 'internal combustion engine', the 'first motor', the 'second motor', and the 'accumulator' of the invention. The power distribution integration mechanism 40 and the transmission 60, 60A, 60B, 100, 100A, 200, or 200A are respectively equivalent to the 'power distribution integration mechanism' and the 'change speed transmission assembly' of the invention. The 'internal combustion engine' is not restricted to the engine 22 that receives a supply of a hydrocarbon fuel, such as gasoline or light oil, and outputs power, but may be an engine of any other design, for example, a hydrogen engine. The 'first motor' and the 'second motor' are not restricted to the motors MG1 and MG2 constructed as the synchronous motor generators but may be motors of any other design, for example, induction motors. The 'accumulator' is not restricted to the battery 35 constructed as the secondary cell but may be any equivalent unit, for example, a capacitor, that enables transmission of electric power to and from the first motor and the second motor. The 'power distribution integration mechanism' is not restricted to the power distribution integration mechanism 40 but may be any planetary gear mechanism constructed to include a first element connecting with a rotating shaft of the first motor, a second element connecting with a rotating shaft of the second motor, and a third element connecting with an engine shaft of the internal combustion engine, to allow mutually differential rotations of the three elements, and to have a gear ratio of approximately 0.5. For example, the planetary gear mechanism may include a first sun gear and a second sun gear having different numbers of teeth and a carrier arranged to hold at least one stepped gear linking a first pinion gear engaging with the first sun gear to a second pinion gear engaging with the second sun gear. The 'change speed transmission assembly' is not restricted to the transmission 60, 60A, 60B, 100, 100A, 200, or 200A but may be any equivalent structure including a first change speed planetary gear mechanism, a first fixation structure, a second change speed planetary gear mechanism, and a transmission state changeover structure. The first change speed planetary gear mechanism is constructed to have an input element connecting with the first element of the power distribution integration mechanism, an output element connecting with a driveshaft, and a fixable element. The first fixation structure is configured to fix the fixable element of the first change speed planetary gear mechanism in a non-rotatable manner and to release the fixable element in a rotatable manner. The second change speed planetary gear mechanism is constructed to have an input element connecting with the second element of the power distribution integration mechanism, an output element connecting with the driveshaft, and a fixable element. The transmission state changeover structure is configured to enable and disable power transmission via the second change speed planetary gear mechanism. The above mapping of the primary elements in the embodiment and its modified examples to the primary constituents in the claims of the invention is not restrictive in any sense but is only illustrative for concretely describing the mode of carrying out the invention. Namely the embodiment and its modified example discussed above are to be considered in all aspects as illustrative and not restrictive.

There may be many modifications, changes, and alterations without departing from the scope or spirit of the main characteristics of the present invention. The scope and spirit of the present invention are indicated by the appended claims, rather than by the foregoing description.

The disclose of Japanese Patent Application No. 2007-164743 filed Jun. 22, 2007 including specification, drawings and claims is incorporated herein by reference in its entirety.

What is claimed is:

1. A power output apparatus configured to output power to a driveshaft, the power output apparatus comprising:
    an internal combustion engine;
    a first motor capable power input and power output;
    a second motor capable power input and power output;
    an accumulator configured to transmit electric power to and from the first motor and the second motor;
    a power distribution integration mechanism being a double pinion planetary gear mechanism including a carrier as a first element connecting with a rotating shaft of the first motor, a sun gear as a second element connecting with a rotating shaft of the second motor, a ring gear as a third element connecting with an engine shaft of the internal combustion engine, and sets of two pinion gears engaging with each other, one of the two pinion gears engaging with the ring gear and the other of the two pinion gears engaging with the sun gear, and configured to allow mutually differential rotations of the three elements and to have a gear ratio of approximately 0.5; and
    a change speed transmission assembly including: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism, the change speed transmission assembly including a coupling device configured to couple and decouple the output element with and from the fixable element of the first change speed planetary gear mechanism, the fixable element of the second change speed planetary gear mechanism being fixed in the non-rotatable manner, the transmission state changeover device being a coupling-decoupling device configured to couple and decouple the second element of the power distribution integration mechanism with and from the input element of the second change speed planetary gear mechanism.

2. The power output apparatus in accordance with claim 1, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a planetary gear mechanism including a first sun gear as the input element, a second sun gear as the output element having a different number of teeth from that of the first sun gear and connected with the carrier of the first change speed planetary gear mechanism and with the driveshaft, and a carrier as the fixable element arranged to hold a stepped gear of linking a first pinion gear engaging with the first sun gear to a second pinion gear engaging with the second sun gear.

3. The power output apparatus in accordance with claim 1, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a double pinion planetary gear mechanism including a sun gear as the input element, a ring gear as the output element, and a carrier as the fixable element arranged to hold sets of two pinion gears engaging with each other, one of the two pinion gears engaging with the sun gear and the other of the two pinion gears engaging with the ring gear.

4. The power output apparatus in accordance with claim 1, the power output apparatus further comprising:
    a second fixation device configured to fix the second element of the power distribution integration mechanism in a non-rotatable manner.

5. The power output apparatus in accordance with claim 4, wherein the change speed transmission assembly includes one single clutch that functions both as the first fixation device and as the coupling device, and one single clutch that functions both as the coupling-decoupling device and as the second fixation device.

6. The power output apparatus in accordance with claim 1, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a single pinion planetary gear mechanism including a ring gear as the input element, a sun gear as the fixable element, and a carrier as the output element arranged to hold pinion gears respectively engaging with both the ring gear and the sun gear.

7. The power output apparatus in accordance with claim 6, wherein the sun gear of the second change speed planetary gear mechanism is attached to a hollow sun gear shaft, and wherein the ring gear of the second change speed planetary gear mechanism is connected with the second element of the power distribution integration mechanism via a shaft located in and passed through the hollow sun gear shaft.

8. The power output apparatus in accordance with claim 6, wherein the sun gear of the second change speed planetary gear mechanism is attached to a hollow sun gear shaft, and wherein the carrier of the second change speed planetary gear mechanism is connected with driveshaft via a shaft located in and passed through the hollow sun gear shaft.

9. A power output apparatus configured to output power to a driveshaft, the power output apparatus comprising:
    an internal combustion engine;

a first motor capable power input and power output;
a second motor capable power input and power output;
an accumulator configured to transmit electric power to and from the first motor and the second motor;
a power distribution integration mechanism being a double pinion planetary gear mechanism including a carrier as a first element connecting with a rotating shaft of the first motor, a sun gear as a second element connecting with a rotating shaft of the second motor, a ring gear as a third element connecting with an engine shaft of the internal combustion engine, and sets of two pinion gears engaging with each other, one of the two pinion gears engaging with the ring gear and the other of the two pinion gears engaging with the sun gear, and configured to allow mutually differential rotations of the three elements and to have a gear ratio of approximately 0.5; and
a change speed transmission assembly including: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism, the change speed transmission assembly including a first coupling device configured to couple and decouple the output element with and from the fixable element of the first change speed planetary gear mechanism, the transmission state changeover device being a second fixation device configured to fix the fixable element of the second change speed planetary gear mechanism in a non-rotatable manner and to release the fixable element in a rotatable manner.

10. The power output apparatus in accordance with claim 9, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a planetary gear mechanism including a first sun gear as the input element, a second sun gear as the output element having a different number of teeth from that of the first sun gear and connected with the carrier of the first change speed planetary gear mechanism and with the driveshaft, and a carrier as the fixable element arranged to hold a stepped gear of linking a first pinion gear engaging with the first sun gear to a second pinion gear engaging with the second sun gear.

11. The power output apparatus in accordance with claim 9, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a double pinion planetary gear mechanism including a sun gear as the input element, a ring gear as the output element, and a carrier as the fixable element arranged to hold sets of two pinion gears engaging with each other, one of the two pinion gears engaging with the sun gear and the other of the two pinion gears engaging with the ring gear.

12. The power output apparatus in accordance with claim 9, wherein the change speed transmission assembly further includes a second coupling device configured to couple and decouple the output element with and from the fixable element of the second change speed planetary gear mechanism.

13. The power output apparatus in accordance with claim 12, wherein the change speed transmission assembly includes one single first clutch functioning both as the first fixation device and as the first coupling device, and one single second clutch functioning both as the second fixation device and as the second coupling device.

14. The power output apparatus in accordance with claim 12, the power output apparatus further comprising:
a third fixation device configured to fix either one of the first element and the second element of the power distribution integration mechanism in a non-rotatable manner.

15. The power output apparatus in accordance with claim 9, wherein the first change speed planetary gear mechanism is a single pinion planetary gear mechanism including a sun gear as the input element, a ring gear as the fixable element, and a carrier as the output element arranged to hold pinion gears respectively engaging with both the sun gear and the ring gear, and wherein the second change speed planetary gear mechanism is a single pinion planetary gear mechanism including a ring gear as the input element, a sun gear as the fixable element, and a carrier as the output element arranged to hold pinion gears respectively engaging with both the ring gear and the sun gear.

16. The power output apparatus in accordance with claim 15, wherein the sun gear of the second change speed planetary gear mechanism is attached to a hollow sun gear shaft, and wherein the ring gear of the second change speed planetary gear mechanism is connected with the second element of the power distribution integration mechanism via a shaft located in and passed through the hollow sun gear shaft.

17. The power output apparatus in accordance with claim 15, wherein the sun gear of the second change speed planetary gear mechanism is attached to a hollow sun gear shaft, and wherein the carrier of the second change speed planetary gear mechanism is connected with driveshaft via a shaft located in and passed through the hollow sun gear shaft.

18. A hybrid vehicle with drive wheels driven by means of power from a driveshaft, the hybrid vehicle comprising:
an internal combustion engine;
a first motor capable power input and power output;
a second motor capable power input and power output;
an accumulator configured to transmit electric power to and from the first motor and the second motor;
a power distribution integration mechanism being a double pinion planetary gear mechanism including a carrier as a first element connecting with a rotating shaft of the first motor, a sun gear as a second element connecting with a rotating shaft of the second motor, a ring gear as a third element connecting with an engine shaft of the internal combustion engine, and sets of two pinion gears engaging with each other, one of the two pinion gears engaging with the ring gear and the other of the two pinion gears engaging with the sun gear, and configured to allow mutually differential rotations of the three elements and to have a gear ratio of approximately 0.5; and a change speed transmission assembly including: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism, the change speed transmission assembly including a coupling device configured to couple and decouple the output element with and from the fixable element of the first change speed planetary gear mechanism, the fixable element of the second change speed planetary gear mechanism being fixed in the non-rotatable manner, the transmission state changeover device being a coupling-decoupling device configured to couple and decouple the second element of the power distribution integration mechanism with and from the input element of the second change speed planetary gear mechanism.

19. A hybrid vehicle with drive wheels driven by means of power from a driveshaft, the hybrid vehicle comprising:
   an internal combustion engine;
   a first motor capable power input and power output;
   a second motor capable power input and power output;
   an accumulator configured to transmit electric power to and from the first motor and the second motor;
   a power distribution integration mechanism being a double pinion planetary gear mechanism including a carrier as a first element connecting with a rotating shaft of the first motor, a sun gear as a second element connecting with a rotating shaft of the second motor, a ring gear as a third element connecting with an engine shaft of the internal combustion engine, and sets of two pinion gears engaging with each other, one of the two pinion gears engaging with the ring gear and the other of the two pinion gears engaging with the sun gear, and configured to allow mutually differential rotations of the three elements and to have a gear ratio of approximately 0.5; and a change speed transmission assembly including: a first change speed planetary gear mechanism having an input element connecting with the first element of the power distribution integration mechanism, an output element connecting with the driveshaft, and a fixable element and configured to allow mutually differential rotations of the three elements; a first fixation device configured to fix the fixable element of the first change speed planetary gear mechanism in a non-rotatable manner and to release the fixable element in a rotatable manner; a second change speed planetary gear mechanism having an input element connecting with the second element of the power distribution integration mechanism, an output element connecting with the driveshaft, and a fixable element and configured to allow mutually differential rotations of the three elements; and a transmission state changeover device configured to change over a state of either one of the input element and the fixable element of the second change speed planetary gear mechanism and thereby enable and disable power transmission via the second change speed planetary gear mechanism, the change speed transmission assembly including a first coupling device configured to couple and decouple the output element with and from the fixable element of the first change speed planetary gear mechanism, the transmission state changeover device being a second fixation device configured to fix the fixable element of the second change speed planetary gear mechanism in a non-rotatable manner and to release the fixable element in a rotatable manner.

* * * * *